US012812552B2

(12) United States Patent
Meshkati et al.

(10) Patent No.: US 12,812,552 B2
(45) **Date of Patent: *Nov. 24, 2026**

(54) TECHNIQUES FOR ACCOUNTING FOR ENERGY CONTRIBUTIONS FROM SOUNDING REFERENCE SIGNAL TRANSMISSIONS OVER MULTIPLE ANTENNA GROUPS TOWARDS AN EXPOSURE LIMIT

(71) Applicant: QUALCOMM Incorporated, San Diego, CA (US)

(72) Inventors: Farhad Meshkati, San Diego, CA (US); Alexei Yurievitch Gorokhov, San Diego, CA (US); Sanghoon Kim, San Jose, CA (US); Troy Curtiss, Boulder, CO (US); Dinesh Kumar Devineni, San Diego, CA (US); Ashok Mantravadi, San Diego, CA (US); Lin Lu, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 327 days.

This patent is subject to a terminal disclaimer.

(21) Appl. No.: 18/511,795

(22) Filed: Nov. 16, 2023

(65) Prior Publication Data

US 2024/0089862 A1 Mar. 14, 2024

Related U.S. Application Data

(63) Continuation of application No. 17/229,528, filed on Apr. 13, 2021, now Pat. No. 11,871,355.

(51) Int. Cl.

*H04W 52/14* (2009.01)
*H04L 5/00* (2006.01)

(Continued)

(52) U.S. Cl.

CPC ......... *H04W 52/146* (2013.01); *H04L 5/0051* (2013.01); *H04L 25/0226* (2013.01); *H04W 52/36* (2013.01); *H04W 52/42* (2013.01)

(58) Field of Classification Search

None

See application file for complete search history.

(56) References Cited

U.S. PATENT DOCUMENTS

| | | | | |
|---|---|---|---|---|
| 2013/0178167 A1* | 7/2013 | Lockerbie | ............ | H04B 1/3838 455/63.4 |
| 2016/0242128 A1* | 8/2016 | Loehr | .................. | H04W 52/34 |

(Continued)

FOREIGN PATENT DOCUMENTS

| | | |
|---|---|---|
| EP | 3780400 A1 | 2/2021 |
| EP | 3907893 A1 | 11/2021 |

(Continued)

OTHER PUBLICATIONS

International Search Report and Written Opinion—PCT/US2022/020365—ISA/EPO—Jun. 28, 2022 (2103727WO).

(Continued)

*Primary Examiner* — Rafael Pérez-Gutiérrez
(74) *Attorney, Agent, or Firm* — Holland & Hart LLP/QUALCOMM Incorporated

(57) ABSTRACT

Methods, systems, and devices for wireless communications are described. In some systems, a user equipment (UE) may transmit a sounding reference signal (SRS) to a base station using an SRS antenna switch (SRS-AS) or an SRS carrier switch (SRS-CS) transmission technique and the UE may feature multiple antenna groups that have separate exposure budgets due to their spatial separation. The UE may employ one or more accounting procedures for tracking energy contributions associated with the SRS across the multiple antenna groups of the UE and may employ one or more power control procedures for setting a transmit power for an (Continued)

uplink signal in accordance with the energy contributions associated with the SRS.

30 Claims, 10 Drawing Sheets

(51) Int. Cl.

| | |
|---|---|
| ***H04L 25/02*** | (2006.01) |
| ***H04W 52/36*** | (2009.01) |
| ***H04W 52/42*** | (2009.01) |

(56) References Cited

U.S. PATENT DOCUMENTS

| | | | | |
|---|---|---|---|---|
| 2019/0104476 | A1* | 4/2019 | Lim | H04W 52/146 |
| 2021/0051601 | A1* | 2/2021 | Cha | H04W 52/367 |
| 2021/0068060 | A1 | 3/2021 | Nilsson | |
| 2021/0297959 | A1* | 9/2021 | Zhou | H04B 1/3838 |
| 2022/0132438 | A1* | 4/2022 | Cha | H04W 52/246 |
| 2022/0159584 | A1* | 5/2022 | Cha | H04B 1/3838 |
| 2022/0330162 | A1 | 10/2022 | Meshkati | |
| 2022/0407573 | A1* | 12/2022 | Dou | H01Q 21/28 |
| 2023/0035862 | A1 | 2/2023 | Yuan et al. | |
| 2023/0216565 | A1 | 7/2023 | Kwak et al. | |
| 2024/0430825 | A1* | 12/2024 | Lee | H04W 52/367 |

FOREIGN PATENT DOCUMENTS

| | | | |
|---|---|---|---|
| WO | 2020156021 | A1 | 8/2020 |
| WO | 2022086432 | A1 | 4/2022 |

OTHER PUBLICATIONS

European Search Report—EP26175533—Search Authority—The Hague—Aug. 27, 2026.

* cited by examiner

TECHNIQUES FOR ACCOUNTING FOR ENERGY CONTRIBUTIONS FROM SOUNDING REFERENCE SIGNAL TRANSMISSIONS OVER MULTIPLE ANTENNA GROUPS TOWARDS AN EXPOSURE LIMIT

CROSS REFERENCE

The present Application for patent is a Continuation of U.S. patent application Ser. No. 17/229,528 by MESHKATI et al., entitled "TECHNIQUES FOR ACCOUNTING FOR ENERGY CONTRIBUTIONS FROM SOUNDING REFERENCE SIGNAL TRANSMISSIONS OVER MULTIPLE ANTENNA GROUPS TOWARDS AN EXPOSURE LIMIT," filed Apr. 13, 2021, assigned to the assignee hereof, and expressly incorporated by reference herein.

FIELD OF DISCLOSURE

The following relates to wireless communications, including techniques for accounting for energy contributions from sounding reference signal (SRS) transmissions over multiple antenna groups towards an exposure limit.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some systems, a UE may transmit an uplink reference signal, such as a sounding reference signal (SRS), to a base station as part of a channel sounding procedure.

SUMMARY

The described techniques relate to improved methods, systems, devices, and apparatuses that support techniques for accounting for energy contributions from sounding reference signal (SRS) transmissions over multiple antenna groups towards an exposure limit. For example, the described techniques provide various accounting mechanisms that a user equipment (UE) may implement to avoid exceeding an exposure limit of the UE in examples in which the UE transmits SRSs via antennas or over carriers other than those that the UE uses for transmission of physical uplink channel transmissions. In some examples, such other antennas may belong to or be part of different antenna groups of the UE, where different antenna groups may be defined in accordance with their physical location on the UE and, as a result, different antenna groups may be associated with different exposure constraints.

In some implementations, for example, the UE may keep a separate account of the energy contributions associated with SRS transmissions for each antenna and for each carrier frequency and may use the separate accounts to determine a separate or individual transmit power limit for each antenna and for each carrier frequency. In some other implementations, the UE may keep a separate account of the energy contributions associated with SRS transmissions for each antenna and for each carrier frequency and may use the separate accounts along with an exposure limit associated with one or more antennas to determine a common backoff parameter for each antenna group that the UE uses to transmit SRS. In some other implementations, the UE may determine an energy contribution associated with an SRS transmission based on an assumed duty cycle of the SRS transmission and may determine, for each antenna group, a common backoff parameter based on the assumed energy contributions and an exposure limit associated with that antenna group. Additionally, in some implementations, the UE may determine energy contributions associated with the SRS transmission based on an actual duty cycle of the SRS transmission and may compare the actual energy contributions to the assumed energy contributions. If the actual energy contributions exceed the assumed energy contributions, the UE may calculate a more conservative (e.g., a larger) backoff parameter for each antenna group or may skip some SRS transmissions to avoid exceeding the exposure limit of the UE.

A method for wireless communication at a UE is described. The method may include selecting, for transmission of an SRS, a first set of antennas, where the first set of antennas are selected from at least one first antenna of a first antenna group of the UE that is associated with a first exposure constraint and at least one second antenna of a second antenna group of the UE that is associated with a second exposure constraint, transmitting, to a base station via the first set of antennas, the SRS over one or more carrier frequencies in accordance with a first transmit power, determining energy contributions associated with the SRS towards the first exposure constraint and the second exposure constraint based on transmitting the SRS, and transmitting, to the base station via one or more antennas of the first antenna group, an uplink signal over a physical uplink channel in accordance with a second transmit power that is based on the energy contributions associated with the SRS.

An apparatus for wireless communication at a UE is described. The apparatus may include a processor, memory coupled with the processor, and instructions stored in the memory. The instructions may be executable by the processor to cause the apparatus to selecting, for transmission of an SRS, a first set of antennas, where the first set of antennas are selected from at least one first antenna of a first antenna group of the UE that is associated with a first exposure constraint and at least one second antenna of a second antenna group of the UE that is associated with a second exposure constraint, transmit, to a base station via the first set of antennas, the SRS over one or more carrier frequencies in accordance with a first transmit power, determine energy contributions associated with the SRS towards the first exposure constraint and the second exposure constraint based on transmitting the SRS, and transmit, to the base station via one or more antennas of the first antenna group, an uplink signal over a physical uplink channel in accordance with a second transmit power that is based on the energy contributions associated with the SRS.

Another apparatus for wireless communication at a UE is described. The apparatus may include means for selecting, for transmission of an SRS, a first set of antennas, where the first set of antennas are selected from at least one first antenna of a first antenna group of the UE that is associated with a first exposure constraint and at least one second antenna of a second antenna group of the UE that is associated with a second exposure constraint, means for transmitting, to a base station via the first set of antennas, the SRS over one or more carrier frequencies in accordance with a first transmit power, means for determining energy contributions associated with the SRS towards the first exposure constraint and the second exposure constraint based on transmitting the SRS, and means for transmitting, to the base station via one or more antennas of the first antenna group, an uplink signal over a physical uplink channel in accordance with a second transmit power that is based on the energy contributions associated with the SRS.

A non-transitory computer-readable medium storing code for wireless communication at a UE is described. The code may include instructions executable by a processor to selecting, for transmission of an SRS, a first set of antennas, where the first set of antennas are selected from at least one first antenna of a first antenna group of the UE that is associated with a first exposure constraint and at least one second antenna of a second antenna group of the UE that is associated with a second exposure constraint, transmit, to a base station via the first set of antennas, the SRS over one or more carrier frequencies in accordance with a first transmit power, determine energy contributions associated with the SRS towards the first exposure constraint and the second exposure constraint based on transmitting the SRS, and transmit, to the base station via one or more antennas of the first antenna group, an uplink signal over a physical uplink channel in accordance with a second transmit power that is based on the energy contributions associated with the SRS.

In some examples of the method, apparatuses, and non-transitory computer-readable medium described herein, determining the energy contributions associated with the SRS may include operations, features, means, or instructions for determining a first energy contribution associated with the transmission of the SRS for each antenna of the at least one first antenna of the first antenna group and each carrier frequency of the one or more carrier frequencies and determining a second energy contribution associated with the transmission of the SRS for each antenna of the at least one second antenna of the second antenna group and each carrier frequency of the one or more carrier frequencies.

Some examples of the method, apparatuses, and non-transitory computer-readable medium described herein may further include operations, features, means, or instructions for determining a first power limit for each antenna of the at least one first antenna of the first antenna group and each carrier frequency of the one or more carrier frequencies based on the first energy contribution for that antenna and that carrier frequency and determining a second power limit for each antenna of the at least one second antenna of the second antenna group and each carrier frequency of the one or more carrier frequencies based on the second energy contribution for that antenna and that carrier frequency.

In some examples of the method, apparatuses, and non-transitory computer-readable medium described herein, the second transmit power of the uplink signal transmitted via the one or more antennas of the first antenna group may be based on determining the first power limit for each antenna of the at least one first antenna of the first antenna group and each carrier frequency of the one or more carrier frequencies.

Some examples of the method, apparatuses, and non-transitory computer-readable medium described herein may further include operations, features, means, or instructions for determining a first common backoff parameter for antennas of the first antenna group for each carrier frequency of the one or more carrier frequencies based on a first exposure limit associated with the at least one first antenna and determining the first energy contribution for each antenna of the at least one first antenna of the first antenna group and each carrier frequency of the one or more carrier frequencies and determining a second common backoff parameter for antennas of the second antenna group for each carrier frequency of the one or more carrier frequencies based on a second exposure limit associated with the at least one second antenna and determining the second energy contribution for each antenna of the at least one second antenna of the second antenna group and each carrier frequency of the one or more carrier frequencies.

In some examples of the method, apparatuses, and non-transitory computer-readable medium described herein, the second transmit power of the uplink signal transmitted via the one or more antennas of the first antenna group may be based on determining the first common backoff parameter for the antennas of the first antenna group for each carrier frequency of the one or more carrier frequencies.

In some examples of the method, apparatuses, and non-transitory computer-readable medium described herein, determining the first common backoff parameter may include operations, features, means, or instructions for determining the first common backoff parameter for the antennas of the first antenna group for each carrier frequency of the one or more carrier frequencies based on applying the first energy contribution for that carrier frequency to the first exposure limit associated with the at least one first antenna.

In some examples of the method, apparatuses, and non-transitory computer-readable medium described herein, determining the second common backoff parameter may include operations, features, means, or instructions for determining the second common backoff parameter for the antennas of the second antenna group for each carrier frequency of the one or more carrier frequencies based on applying the second energy contribution for that carrier frequency to the second exposure limit associated with the at least one second antenna.

In some examples of the method, apparatuses, and non-transitory computer-readable medium described herein, determining the energy contributions associated with the SRS may include operations, features, means, or instructions for determining a first energy contribution associated with an assumed duty cycle for the transmission of the SRS for each carrier frequency of the one or more carrier frequencies.

In some examples of the method, apparatuses, and non-transitory computer-readable medium described herein, the first energy contribution may be a largest energy contribution relative to other energy contributions associated with a remainder of possible duty cycles for that carrier frequency in accordance with a configuration of the transmission of the SRS.

Some examples of the method, apparatuses, and non-transitory computer-readable medium described herein may further include operations, features, means, or instructions for determining a first common backoff parameter for antennas of the first antenna group for each carrier frequency of the one or more carrier frequencies based on a first exposure limit associated with the at least one first antenna and determining the first energy contribution associated with the assumed duty cycle for the transmission of the SRS for each carrier frequency of the one or more carrier frequencies and determining a second common backoff parameter for antennas of the second antenna group for each carrier frequency of the one or more carrier frequencies based on a second exposure limit associated with the at least one second antenna and determining the first energy contribution associated with the assumed duty cycle for the transmission of the SRS for each carrier frequency of the one or more carrier frequencies.

In some examples of the method, apparatuses, and non-transitory computer-readable medium described herein, the second transmit power of the uplink signal transmitted via the one or more antennas of the first antenna group may be based on determining the first common backoff parameter for the antennas of the first antenna group for each carrier frequency of the one or more carrier frequencies.

In some examples of the method, apparatuses, and non-transitory computer-readable medium described herein, determining the first common backoff parameter may include operations, features, means, or instructions for determining the first common backoff parameter for the antennas of the first antenna group for each carrier frequency of the one or more carrier frequencies based on applying the first energy contribution for that carrier frequency to the first exposure limit associated with the at least one first antenna.

In some examples of the method, apparatuses, and non-transitory computer-readable medium described herein, determining the second common backoff parameter may include operations, features, means, or instructions for determining the second common backoff parameter for the antennas of the second antenna group for each carrier frequency of the one or more carrier frequencies based on applying the first energy contribution for that carrier frequency to the second exposure limit associated with the at least one second antenna.

Some examples of the method, apparatuses, and non-transitory computer-readable medium described herein may further include operations, features, means, or instructions for determining a second energy contribution associated with an actual duty cycle for the transmission of the SRS in accordance with the configuration of the transmission of the SRS for each carrier frequency of the one or more carrier frequencies and comparing the second energy contribution associated with the actual duty cycle with the first energy contribution associated with the assumed duty cycle for at least one carrier frequency of the one or more carrier frequencies.

Some examples of the method, apparatuses, and non-transitory computer-readable medium described herein may further include operations, features, means, or instructions for determining that the second energy contribution may be greater than the first energy contribution based on the comparing and accounting for the energy contributions associated with the transmission of the SRS collectively across the first set of antennas to obtain a total energy contribution for the transmission of the SRS across the first antenna group and the second antenna group, where the second transmit power may be based on the total energy contribution.

Some examples of the method, apparatuses, and non-transitory computer-readable medium described herein may further include operations, features, means, or instructions for determining that the second energy contribution may be greater than the first energy contribution based on the comparing and skipping one or more SRS transmissions based on determining that the second energy contribution may be greater than the first energy contribution.

In some examples of the method, apparatuses, and non-transitory computer-readable medium described herein, transmitting the SRS in accordance with the first transmit power may include operations, features, means, or instructions for transmitting the SRS in accordance with the first transmit power based on an exposure limit of the UE.

In some examples of the method, apparatuses, and non-transitory computer-readable medium described herein, transmitting the SRS in accordance with the first transmit power based on the exposure limit of the UE may include operations, features, means, or instructions for applying the exposure limit to first SRS transmissions absent of carrier switching and refraining from applying the exposure limit to second SRS transmissions associated with carrier switching.

In some examples of the method, apparatuses, and non-transitory computer-readable medium described herein, transmitting the SRS in accordance with the first transmit power based on the exposure limit of the UE may include operations, features, means, or instructions for applying the exposure limit to first SRS transmissions via the at least one first antenna of the first antenna group and refraining from applying the exposure limit to second SRS transmissions via the at least one second antenna of the second antenna group.

In some examples of the method, apparatuses, and non-transitory computer-readable medium described herein, transmitting the SRS in accordance with the first transmit power may include operations, features, means, or instructions for transmitting the SRS in accordance with the first transmit power irrespective of an exposure limit of the UE.

In some examples of the method, apparatuses, and non-transitory computer-readable medium described herein, the UE uses antennas of the first antenna group for physical uplink channel transmissions and refrains from using antennas of the second antenna group for the physical uplink channel transmissions.

In some examples of the method, apparatuses, and non-transitory computer-readable medium described herein, the first antenna group of the UE includes a first number of antennas located at a first location on the UE and the second antenna group of the UE includes a second number of antennas located at a second location on the UE.

DETAILED DESCRIPTION

Figure 1:
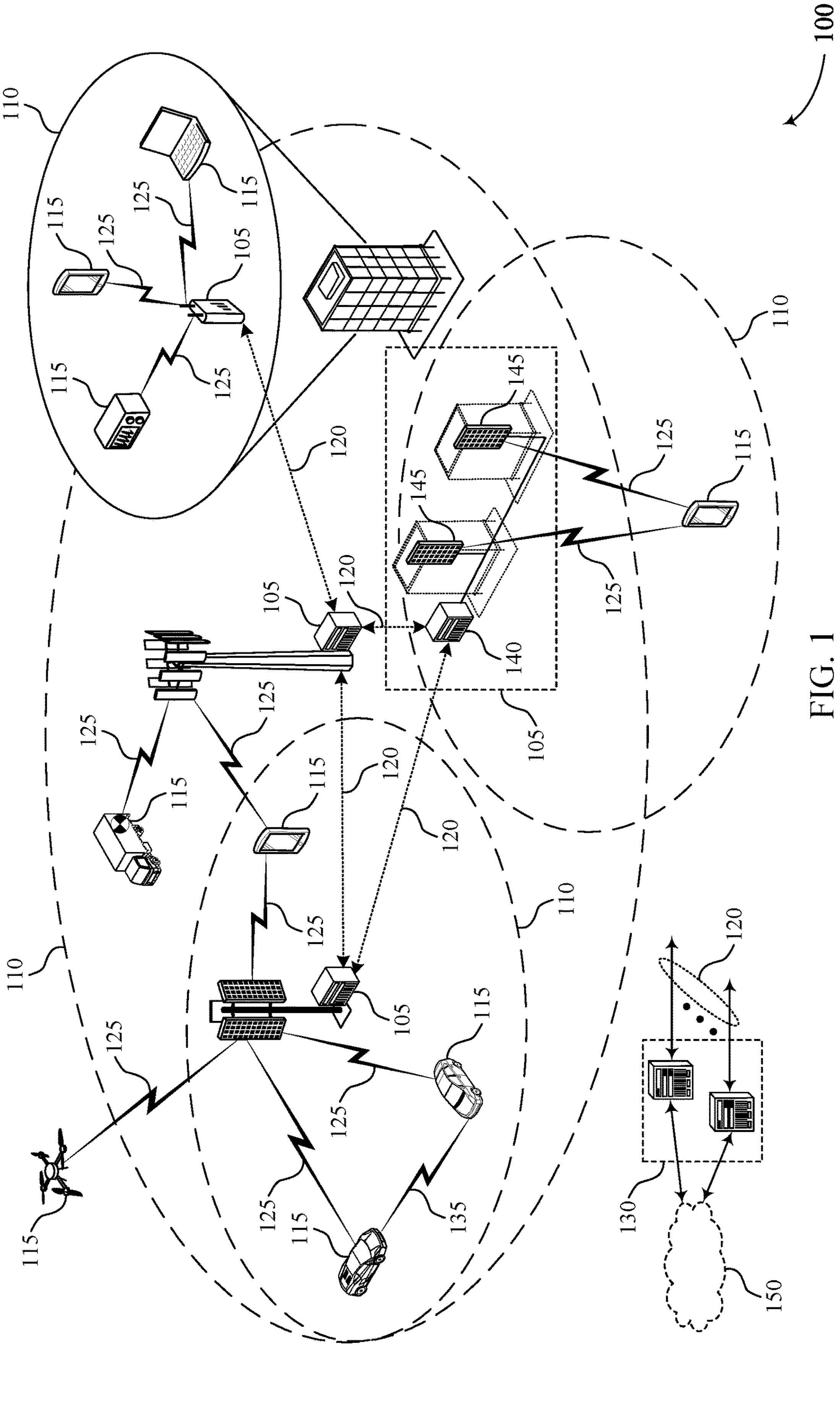
FIGS. 1 and 2 illustrate examples of wireless communications systems that support techniques for accounting for energy contributions from sounding reference signal (SRS) transmissions over multiple antenna groups towards an exposure limit in accordance with various aspects of the present disclosure.

In some systems, a user equipment (UE) and a base station may communicate via uplink and downlink signaling via uplink and downlink channels, respectively. To support knowledge of the channel conditions between the UE and the base station, the UE may transmit one more or uplink reference signals, such as sounding reference signals (SRSs), to the base station for channel estimation. In some examples (e.g., and for the purpose of downlink channel estimation), the UE may transmit an SRS via an antenna or over a carrier different from antennas or carriers that the UE may use for other uplink transmissions to the base station (e.g., such as for physical uplink shared channel (PUSCH) or physical uplink control channel (PUCCH) transmissions). For example, the UE may operate a number of antennas and may use a subset of the number of antennas for PUSCH or PUCCH transmissions. Further, the number of antennas that the UE operates may be located at various physical locations on the UE and some antennas may be grouped together to form an antenna group.

As such, an antenna group of the UE may refer to a set of antennas of the UE that are located at similar physical locations on the UE and, in some examples, different antenna groups may have different or separate exposure constraints or budgets as a result of their different physical locations on the UE. Additionally or alternatively, an antenna group may refer to any set of antennas of the UE that are grouped together regardless of physical location (e.g., for calculating different or separate exposure constraints or budgets or for various other reasons). Accordingly, the UE may potentially transmit an SRS over antennas of a different antenna group than antennas that the UE uses for PUSCH or PUCCH transmissions. Further, the UE may use different antennas within a same antenna group for different transmission types, such that the UE may potentially transmit an SRS over a first set of antennas of a first antenna group and may transmit PUSCH or PUCCH transmissions over a second set of antennas of the first antenna group. In some cases, however, such a potential for SRS transmission via antennas of different antenna groups than (or via different antennas of the same antenna group as) PUSCH or PUCCH transmissions may result in ambiguous accounting of the energy contributions associated with the SRS transmission, which may potentially lead to a violation of an exposure limit of the UE.

In some implementations of the present disclosure, the UE may employ various accounting methods and procedures for tracking an energy contribution of an SRS transmission via antennas spanning multiple antenna groups and for setting a transmission power for other uplink signaling from the UE such that the UE avoids violating an exposure limit of the UE. The present disclosure provides accounting methods and procedures, as well as power control procedures, that may be implemented at various levels of granularity. In some examples, for instance, the UE may keep separate accounts of the energy contributions of the SRS transmission for each antenna of each antenna group and for each of one or more carrier frequencies over which the UE may transmit the SRS. Alternatively, in some other examples, the UE may determine, calculate, or estimate the energy contributions of the SRS transmission based on an assumed duty cycle of the SRS transmission. Further, for power control, the UE may determine separate power limits for each antenna of each antenna group and for each carrier frequency, may determine a common backoff parameter for antennas (e.g., all antennas) of each antenna group and for each carrier frequency, may switch from multi-antenna group operation to single-antenna group operation for SRS transmission, or may skip one or more SRS transmissions.

Some implementations of the subject matter described in this disclosure can be implemented to realize one or more of the following potential advantages. For example, the described techniques may be implemented to provide more accurate accounting of energy contributions of SRS transmissions via antennas spanning multiple antenna groups (that each have different exposure constraints or budgets) or via antennas of a same antenna group that the UE uses for different transmission types, which may increase the likelihood for the UE to satisfy or operate in compliance with any exposure limits of the UE. Further, as a result of such a higher likelihood for the UE to operate in compliance with any exposure limits while transmitting SRSs via antennas of different antenna groups, the UE and the base station may achieve more accurate or diverse channel estimation, which may result in the base station configuring more suitable communication parameters or more efficiently scheduling communication. As such, the UE and the base station may experience higher or more suitable data rates, greater spectral efficiency, and increased system capacity.

Aspects of the disclosure are initially described in the context of wireless communications systems. Additionally, aspects of the disclosure Aspects of the disclosure are further illustrated by and described with reference to apparatus diagrams, system diagrams, and flowcharts that relate to techniques for accounting for energy contributions from SRS transmissions over multiple antenna groups towards an exposure limit.

FIG. 1 illustrates an example of a wireless communications system 100 that supports techniques for accounting for energy contributions from SRS transmissions over multiple antenna groups towards an exposure limit in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta_f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). In some examples, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at various orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as “listening” according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may transmit an uplink reference signal, such as an SRS, to a base station 105 as part of a channel sounding or channel estimation procedure. In some examples, the UE 115 may employ an antenna switching or a carrier switching SRS transmission technique, which may be equivalently referred to as SRS-antenna switch (SRS-AS) and SRS-carrier switch (SRS-CS). Additionally, in some examples, the UE 115 may employ a smart transmit technique for specific absorption rate (SAR) or maximum permissible exposure (MPE) compliance. For example, the UE 115 may operate or otherwise feature a number of different sets of antennas, which may be equivalently referred to as antenna groups, and the different sets of antennas may have separate exposure constraints or budgets. As such, the UE 115 may potentially transmit an SRS via antennas of different antenna groups, which may complicate or result in ambiguous accounting of energy contributions from the SRS towards an exposure limit of the UE 115.

Accordingly, some implementations of the present disclosure provide accounting procedures for tracking the energy contributions from an SRS that is transmitted via antennas of different antenna groups as well as for using such accounted SRS energy contributions to determine parameters or information relating to a power control operation or procedure according to which the UE 115 may determine a transmit power for other uplink transmissions from the UE 115. As a result of such accounting of energy contributions from SRS-AS or SRS-CS transmissions, the UE 115 and the base station 105 may achieve more complete channel estimation while operating in compliance with any exposure limits of the UE 115.

Figure 2:
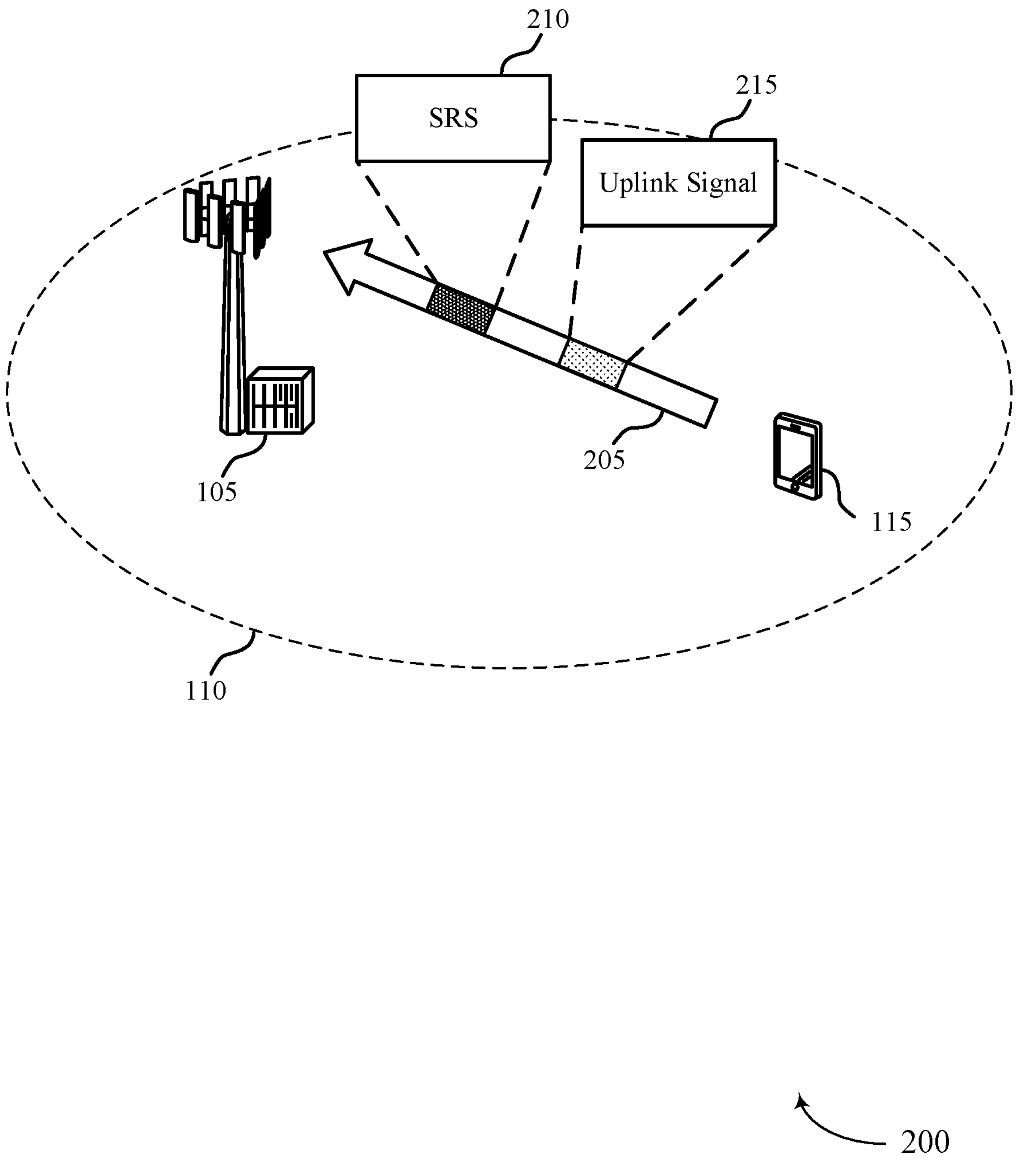

FIG. 2 illustrates an example of a wireless communications system 200 that supports techniques for accounting for energy contributions from SRS transmissions over multiple antenna groups towards an exposure limit in accordance with various aspects of the present disclosure. The wireless communications system 200 may implement or be implemented to realize aspects of the wireless communications system 200. For example, the wireless communications system 200 illustrates communication between a UE 115 and a base station 105 over a communication link 205 within a geographic coverage area 110, and the UE 115 and the base station 105 may be examples of corresponding devices described herein, including with reference to FIG. 1. In some examples, the UE 115 may transmit an SRS 210 to the base station 105 using an SRS-AS or an SRS-CS transmission technique and may account for energy contributions from the SRS transmission in accordance with the various procedures described herein.

For example, the UE 115 may transmit the SRS 210 to the base station 105 as part of a channel estimation or a channel sounding procedure. For instance, the base station 105 may receive and measure the SRS 210 for uplink channel estimation and may use the uplink channel estimation to determine or otherwise configure an uplink modulation and coding scheme (MCS) or a rank for uplink transmissions or for uplink scheduling decisions. In some examples, and as a result of channel reciprocity, the base station 105 may also use the SRS 210 for downlink channel estimation and may use the downlink channel estimation to determine or otherwise configure a downlink modulation and coding scheme (MCS) or a rank for downlink transmissions or for downlink scheduling decisions.

In such examples in which the base station 105 uses the SRS 210 for downlink channel estimation (and in examples in which the UE 115 and the base station 105 communicate in accordance with a TDD mode), the UE 115 may transmit the SRS 210 on antennas or carriers other than those that are used for other uplink signaling (such as PUSCH or PUCCH transmissions). For example, the UE 115 may use a first antenna for uplink transmissions and may use a total of four antennas (which may or may not include the first antenna) for receiving downlink transmissions and, for downlink channel estimation, the UE 115 may transmit the SRS 210 via antennas other than the first antenna. In another example, the UE 115 may use a total of two antennas for uplink transmissions and may use a total of four antennas (which may or may not include the two antennas used for uplink transmissions) for receiving downlink transmissions and, for downlink channel estimation, the UE 115 may transmit the SRS 210 via antennas other than the two antennas used for uplink transmissions. Such transmission of the SRS 210 on antennas or carriers different than antennas or carriers that the UE 115 uses for PUSCH or PUCCH transmissions may be referred to as SRS-AS or SRS-CS.

Further, in some examples, the UE 115 may employ a smart transmit transmission technique for SAR or MPE compliance, which may involve the use of time averaging to ensure that any SAR or MPE constraints are met while allowing instantaneous increase in UE transmission power beyond an average power constraint. In other words, as a result of employing a smart transmit technique, the UE 115 may be able to temporarily exceed an average power or exposure limit as long as the UE 115 is below the average power or exposure limit after time averaging the transmission power of the UE 115. Additionally, if employing a smart transmit technique, the UE 115 may feature or configure separate exposure constraints or budgets for different sets of antennas (as long as there is sufficient spatial separation between the different sets of antennas so that the total exposure is still below regulatory constraints).

For example, the UE 115 may operate or otherwise feature a number of antennas that are located at various physical locations on the UE 115 and, in some examples, the UE 115 may divide, group, or partition the number of antennas into a number of sets of antennas based on the location of the antennas on the UE 115. In some examples, for instance, the UE 115 may group antennas based on proximity, such that a set of antennas may include antennas that are relatively spatially proximate to each other and antennas of different sets of antennas are relatively spatially distant from each other. As described herein, such a set of antennas may be equivalently referred to as an antenna group and, as a result different antenna groups being located at different physical locations on the UE 115, different antenna groups may have different SAR or MPE limits.

As such, during SRS-AS or SRS-CS operation according to which the UE 115 may transmit the SRS 210 over various antennas, the UE 115 may transmit the SRS via an antenna of an antenna group that is different from an antenna group that the UE 115 uses for PUSCH or PUCCH transmissions. For example, the UE 115 may transmit an uplink signal 215 (e.g., a PUSCH or PUCCH transmission) via one or more antennas of a first antenna group and may transmit the SRS 210 via at least one antenna of the first antenna group and at least one antenna of a second antenna group (or exclusively from at least one antenna of the second antenna group). Thus, because different antenna groups have different exposure limits, the UE 115 may employ energy contribution accounting and power control procedures such that the SRS-AS or SRS-CS contribution is appropriately handled towards the total exposure limit of the UE 115.

Accordingly, various implementations of the present disclosure provide such accounting and power control procedures such that the UE 115 may transmit the SRS 210 using SRS-AS or SRS-CA techniques without exceeding an exposure limit of the UE 115. Further, the various implementations of the present disclosure provide such accounting and power control procedures at varying levels of granularity, which may allow the UE 115 to achieve any balance of accuracy and computational complexity.

In some implementations, the UE 115 may keep a separate account of the energy contributions from the SRS 210 on each antenna of each antenna group that the UE 115 uses for SRS transmission (or on each antenna group) and for each carrier frequency of one or more carrier frequencies over which the UE 115 may transmit the SRS 210. In some examples, the UE 115 may use the SRS energy usage corresponding to each antenna (or each antenna group) and each carrier frequency to determine or calculate a transmit power limit for each antenna (or each antenna group) and for each carrier frequency. As such, the UE 115 may set a transmit power for other uplink signaling, such as the uplink signal 215, such that the transmit power for the uplink signaling is less than or equal to the power limit for any relevant antennas (e.g., the antennas via which the UE 115 transmits the uplink signaling) and any relevant carrier frequency.

In some other examples, the UE 115 may use the SRS energy usage corresponding to each antenna (or each antenna group) and each carrier frequency and an exposure limit of an antenna of each antenna group to determine or calculate a backoff parameter or value that is common for antennas (e.g., all antennas) of that antenna group. For example, if the UE 115 transmits the SRS 210 via a first set of antennas of the first antenna group and via a second set of antennas of the second antenna group, the UE 115 may determine a first common backoff parameter for antennas of the first antenna group and a second common backoff parameter for antennas of the second antenna group. In some examples, the UE 115 may determine the first common backoff parameter based on the SRS energy contributions measured from the first set of antennas of the first antenna group and a first exposure limit associated with the first set of antennas (or associated with any antennas of the first antenna group). Similarly, the UE 115 may determine the second common backoff parameter based on the SRS energy contributions measured from the second set of antennas of the second antenna group and a second exposure limit associated with the second set of antennas (or associated with any antennas of the second antenna group).

The UE 115 may select or calculate such exposure limits associated with the different sets of antennas in various ways. In some implementations, for example, the UE 115 may select a lowest or minimum exposure limit (e.g., a worst-case exposure limit) of the first set of antennas of the first antenna group as the first exposure limit and may select a lowest or minimum exposure limit (e.g., a worst-case exposure limit) of the second set of antennas of the second antenna group as the second exposure limit. Alternatively, in some other implementations, the UE 115 may determine or calculate an average exposure limit of the first set of antennas of the first antenna group as the first exposure limit and may determine or calculate an average exposure limit of the second set of antennas of the second antenna group as the second exposure limit.

In some examples, the UE 115 may determine or calculate such average exposure limits using a weighted average that the UE 115 may determine in accordance with the relative usage of each antenna for SRS transmission. For example, an exposure limit of an antenna that transmits SRS relatively more frequently may be amplified or counted more times in the averaging computation relative to an exposure limit of an antenna that transmits SRS relatively less frequently. Further, the UE 115 may select, determine, or calculate the first exposure limit or the second exposure limit, or both, using any other selection criteria or mathematical computation (e.g., a square root computation, a subtraction computation, an addition computation, etc.) without exceeding the scope of the present disclosure.

Additionally or alternatively, the UE 115 may, in some examples, determine or calculate the first exposure limit or the second exposure limit, or both, as a delta relative to an exposure limit associated with antennas of that respective antenna group that the UE 115 uses for the uplink signal 215 (e.g., a PUSCH or PUCCH transmission). For example, the UE 115 may determine an exposure limit associated with the first set of antennas of the first antenna group (either as a worst-case exposure limit or an average exposure limit) and may find a difference or delta between that exposure limit and an exposure limit associated with antennas of the first antenna group that are used for PUSCH or PUCCH transmissions (which may similarly be a worst-case exposure limit or an average exposure limit of the antennas used for PUSCH or PUCCH transmissions). In such examples, the UE 115 may use such a difference or a delta as the first exposure limit associated with the first set of antennas (or associated with any antenna of the first antenna group). In some aspects, the UE 115 may determine or calculate such a delta if the UE 115 obtains power reports that account for SRS transmission power and PUSCH or PUCCH transmission power collectively (e.g., if the UE 115 does not receive separate power reports for SRS transmissions and PUSCH or PUCCH transmissions).

Accordingly, the UE 115 may determine the first common backoff parameter based on or as a result of applying the energy contributions associated with the SRS transmission over the first set of antennas of the first antenna group to the first exposure limit (e.g., a worst-case exposure limit of the first set of antennas, an average exposure limit of the first set of antennas, or a delta between either a worst-case or an average exposure limit of the first set of antennas and an exposure limit associated with PUSCH or PUCCH antennas of the first antenna group). The UE 115 may similarly determine the second common backoff parameter based on or as a result of applying the energy contributions associated with the SRS transmission over the second set of antennas of the second antenna group to the second exposure limit (e.g., a worst-case exposure limit of the second set of antennas, an average exposure limit of the second set of antennas, or a delta between either a worst-case or an average exposure limit of the second set of antennas and an exposure limit associated with PUSCH or PUCCH antennas of the second antenna group). In some examples, the UE 115 may determine a first common backoff parameter for antennas of the first antenna group and a second common backoff parameter for antennas of the second antenna group for each carrier frequency, such that the common backoff parameters for the antennas of the first antenna group and the antennas of the second antenna group may vary for different carrier frequencies.

In some other implementations, the UE 115 may determine the energy contributions from the SRS 210 based on an assumed duty cycle. For example, the UE 115 may compute an assumed worst-case SRS-AS or SRS-CS duty cycle in accordance with an SRS configuration per carrier frequency. Such a worst-case duty cycle may refer to or be understood as a duty cycle that is associated with a greatest SRS energy contribution relative to a remainder of possible duty cycles (e.g., a remainder of duty cycles that are possible given the SRS configuration). The SRS configuration may include or refer to whether the SRS transmission is periodic, semi-persistent, or aperiodic, a number of transmit or receive ports for sounding, or a number of SRS symbols, among other parameters or settings associated with the SRS transmission.

In such implementations in which the UE 115 determines the assumed worst-case duty cycle, the UE 115 may determine or compute SRS-AS or SRS-AC exposure contributions based on or in accordance with the assumed worst-case duty cycle and may determine one or more common backoff parameters based on the assumed SRS-AS or SRS-AC energy contributions and exposure limits associated with the antennas of the first antenna group or the second antenna group that the UE 115 uses for SRS transmission. For example, the UE 115 may select, determine, or calculate a first exposure limit associated with the first set of antennas (or associated with any antennas of the first antenna group) and a second exposure limit associated with the second set of antennas (or associated with any antennas of the second antenna group), as described in more detail herein. For example, the first exposure limit may be a worst-case exposure limit of the first set of antennas, an average exposure limit of the first set of antennas, or a delta between either a worst-case or an average exposure limit of the first set of antennas and an exposure limit associated with PUSCH or PUCCH antennas of the first antenna group. Similarly, the second exposure limit may be a worst-case exposure limit of the second set of antennas, an average exposure limit of the second set of antennas, or a delta between either a worst-case or an average exposure limit of the second set of antennas and an exposure limit associated with PUSCH or PUCCH antennas of the second antenna group.

In such examples, the UE 115 may determine a first common backoff parameter for antennas of the first antenna group based on applying the assumed SRS energy contribution to the first exposure limit and may determine a second common backoff parameter for antennas of the second antenna group based on applying the assumed SRS energy contribution to the second exposure limit. In some examples, the UE 115 may compute the assumed worst-case duty cycle based on the SRS configuration per carrier frequency and may further compute the common backoff parameters for the various antenna groups of the UE 115 for each carrier frequency. As such, the common backoff parameters for the antennas of the first antenna group and the antennas of the second antenna group may vary for different carrier frequencies.

In some implementations, the UE 115 may compute an actual SRS duty cycle based on the SRS configuration (e.g., based on whether the SRS transmission is periodic, semi-persistent, or aperiodic, a number of transmit or receive ports for sounding, or a number of SRS symbols, among other parameters or settings associated with the SRS transmission) per carrier frequency. In such implementations, the UE 115 may compare the energy contributions associated with the actual SRS duty cycle to the energy contributions associated with the assumed (worst-case) duty cycle (according to which currently employed backoff parameters are calculated or, in other words, from which currently employed backoff parameters are derived). If the UE 115 determines, as a result of the comparison, that the energy contributions associated with the actual SRS duty cycle are greater than the energy contributions associated with the assumed (worst-case) duty cycle, the UE 115 may perform one or more operations or procedures for re-adjusting the backoff parameters or that otherwise reduce the likelihood that the UE 115 exceeds an exposure limit of the UE 115.

In some examples, if the UE 115 determines that the energy contributions associated with the actual SRS duty cycle are greater than the energy contributions associated with the assumed (worst-case) duty cycle, the UE 115 may switch smart transmit operation from multi-antenna group operation to single-antenna group operation. In such examples, for instance, the UE 115 may assume that all antennas of the UE 115 contribute toward a same exposure constraint (e.g., the UE 115 may no longer treat or recognize the first antenna group and the second antenna group as having different or separate exposure budgets). Alternatively, the UE 115 may switch from transmitting the SRS 210 via antennas of both the first antenna group and the second antenna group to transmitting the SRS 210 via antennas of the first antenna group (e.g., the antenna group also used for PUSCH or PUCCH transmissions), which may simplify energy contribution accounting. Additionally or alternatively, the UE 115 may skip some SRS transmissions to keep the energy contributions associated with the actual duty cycle below the energy contributions associated with the assumed duty cycle (as skipping some SRS transmissions may reduce the SRS energy contributions after time averaging).

Further, the UE 115 may set or determine a transmit power for the SRS 210 based on SAR or MPE limits or may set or determine the transmit power for the SRS 210 based on a maximum transmit power level (MTPL) excluding SAR or MPE limits. In examples in which the UE 115 sets or determines the transmit power for the SRS 210 based on SAR or MPE limits, the UE 115 may keep SRS transmission limits consistent with PUSCH or PUCCH transmission limits, which may prevent a negative or adverse impact on uplink transmissions from the UE 115 (as more transmit power may be available for uplink transmissions). Alternatively, in examples in which the UE 115 bypasses SAR or MPE limits for SRS transmissions, the UE 115 may transmit the SRS 210 with a greater transmit power, which may result in more accurate or more complete channel estimation (e.g., downlink channel estimation which benefits the downlink or uplink channel estimation that benefits the uplink).

As such, in some implementations of the present disclosure, the UE 115 may apply SAR or MPE limits to SRS transmissions (e.g., all SRS transmissions) except for SRS-AS or SRS-CS transmissions. In some other implementations, the UE 115 may apply SAR or MPE limits to SRS transmissions (e.g., only to SRS transmissions) on antennas that are also used for PUSCH or PUCCH transmissions. Accordingly, in such implementations, the UE 115 may refrain from applying SAR or MPE limits for SRS-AS or SRS-CS transmissions.

Further, although described herein in the context of using antennas for SRS transmission that are of or associated with a different antenna group than antennas that the UE 115 uses for PUSCH or PUCCH transmission, the same techniques may be used in examples in which the UE 115 uses a subset of antennas of a first antenna group for PUSCH or PUCCH transmission and some other one or more antennas outside of the subset for SRS transmission. For example, the first antenna group may include a first antenna, a second antenna, a third antenna, and a fourth antenna, and the UE 115 may use the first antenna and the second antenna for PUSCH or PUCCH transmission as well as for SRS transmission and may use the third antenna and the fourth antenna for SRS transmission (and not for PUSCH or PUCCH transmission). The UE 115 may account for energy contributions associated with the SRS transmission from the third antenna and the fourth antenna in accordance with the various implementations of the present disclosure (e.g., using separate power limits for each antenna of the first antenna group, applying a backoff to the exposure limit of the first antenna group, etc.).

Figure 3:
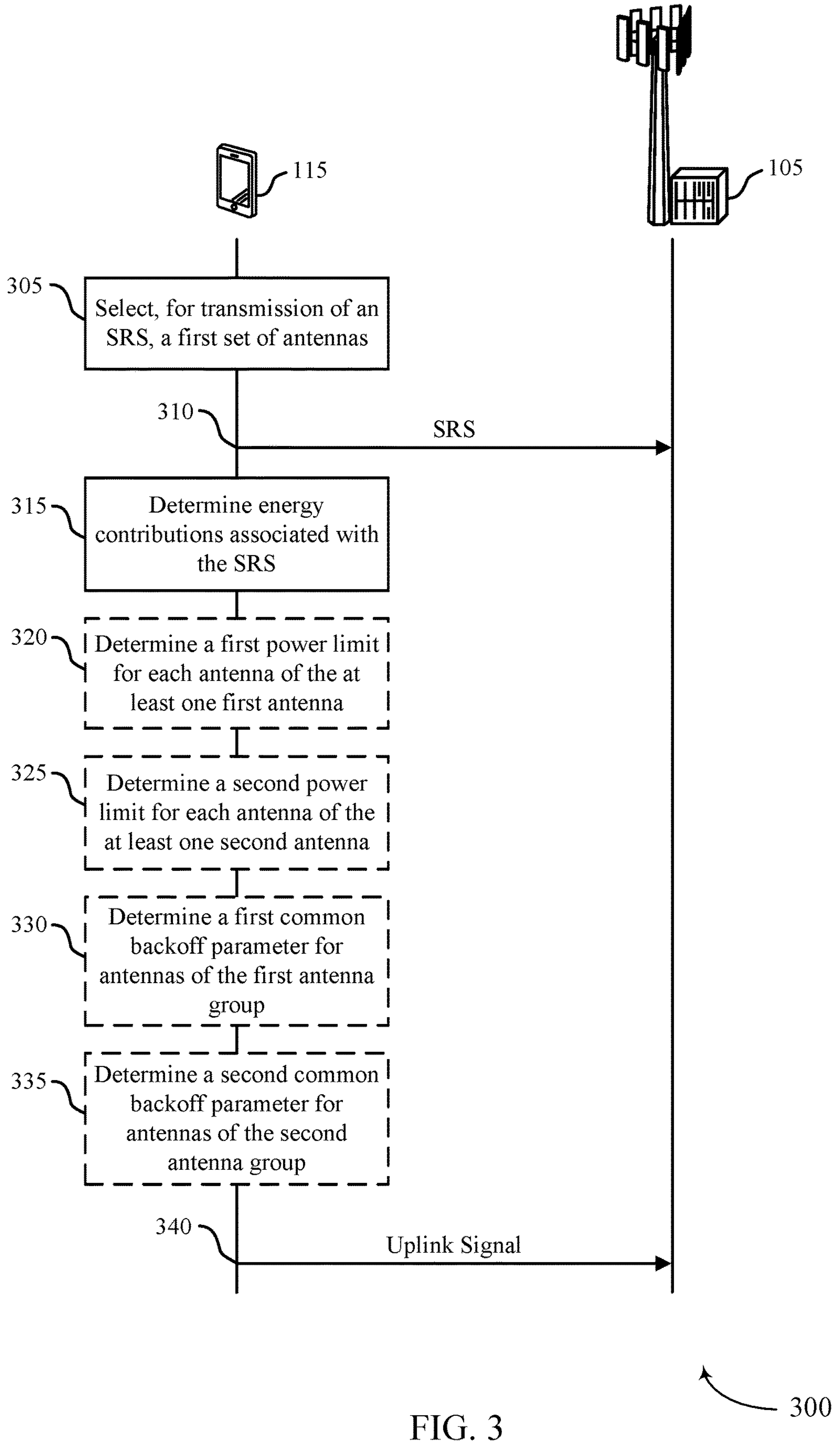
FIG. 3 illustrates an example of a process flow that supports techniques for accounting for energy contributions from SRS transmissions over multiple antenna groups towards an exposure limit in accordance with various aspects of the present disclosure.

FIG. 3 illustrates an example of a process flow 300 that supports techniques for accounting for energy contributions from SRS transmissions over multiple antenna groups towards an exposure limit in accordance with various aspects of the present disclosure. The process flow 300 may implement or be implemented to realize aspects of the wireless communications system 100 or the wireless communications system 200. For example, the process flow 300 illustrates communication between a UE 115 and a base station 105, which may be examples of corresponding devices described herein, including with reference to FIGS. 1 and 2. In some examples, the UE 115 may implement one or more accounting or power control procedures to facilitate SRS transmission handling in examples in which the UE 115 employs a smart transmit transmission technique.

At 305, the UE 115 may select, for transmission of an SRS, a first set of antennas. In some examples, the UE 115 may select the first set of antennas from at least one first antenna of a first antenna group of the UE 115 that is associated with a first exposure constraint and at least one second antenna of a second antenna group of the UE 115 that is associated with a second exposure constraint. In some aspects, the UE 115 may use antennas of the first antenna group for PUSCH or PUCCH transmissions and may refrain from using antennas of the second antenna group for PUSCH or PUCCH transmissions.

At 310, the UE 115 may transmit, to the base station 105 via the first set of antennas, the SRS over one or more carrier frequencies in accordance with a first transmit power. In some examples, the UE 115 may employ an SRS-AS or an SRS-CS transmission technique for transmitting the SRS and may set the first transmit power in accordance with SAR or MPE limits or based on an MTPL excluding SAR or MPE limits, as described in more detail herein, including with reference to FIG. 2.

At 315, the UE 115 may determine energy contributions associated with the SRS towards the first exposure constraint and the second exposure constraint based on or as a result of transmitting the SRS. The UE 115 may determine the energy contributions associated with the SRS in various ways, such as by accounting for each antenna or antenna group separately or based on an assumed or actual SRS duty cycle, as described in more detail with reference to FIG. 2.

At 320, the UE 115 may, in some implementations, determine a first power limit for each antenna of the at least one first antenna of the first antenna group and each carrier frequency of the one or more carrier frequencies based on an energy contribution for that antenna and that carrier frequency. For example, if the UE 115 accounts for SRS energy contributions for each antenna and for each carrier frequency of the first antenna group, the UE 115 may use such separate SRS energy accounts to determine separate power limits for each antenna of the first antenna group and for each carrier frequency.

At 325, the UE 115 may, in some implementations, determine a second power limit for each antenna of the at least one second antenna of the second antenna group and each carrier frequency of the one or more carrier frequencies based on an energy contribution for that antenna and that carrier frequency. For example, if the UE 115 accounts for SRS energy contributions for each antenna and for each carrier frequency of the second antenna group, the UE 115 may use such separate SRS energy accounts to determine separate power limits for each antenna of the second antenna group and for each carrier frequency.

At 330, the UE 115 may, in some implementations, determine a first common backoff parameter for antennas of the first antenna group for each carrier frequency of the one or more carrier frequencies based on a first exposure limit associated with the at least one first antenna and an energy contribution for that antenna and that carrier frequency. For example, for each carrier frequency, the UE 115 may apply the SRS energy contributions associated with the first antenna group to the first exposure limit (which may be a worst-case exposure limit of the at least one first antenna, an average exposure limit of the at least one first antenna, or a delta between either a worst-case or an average exposure limit of the at least one first antenna and an exposure limit associated with PUSCH or PUCCH antennas of the first antenna group) to determine the first common backoff parameter for that carrier frequency.

At 335, the UE 115 may, in some implementations, determine a second common backoff parameter for antennas of the second antenna group for each carrier frequency of the one or more carrier frequencies based on a second exposure limit associated with the at least one second antenna and an energy contribution for that antenna and that carrier frequency. For example, for each carrier frequency, the UE 115 may apply the SRS energy contributions associated with the second antenna group to the second exposure limit (which may be a worst-case exposure limit of the at least one second antenna, an average exposure limit of the at least one second antenna, or a delta between either a worst-case or an average exposure limit of the at least one second antenna and an exposure limit associated with PUSCH or PUCCH antennas of the second antenna group) to determine the second common backoff parameter for that carrier frequency.

At 340, the UE 115 may transmit, to the base station 105 via one or more antennas of the first antenna group, an uplink signal over a physical uplink channel (e.g., such as a PUSCH or a PUCCH) in accordance with a second transmit power that is based on the energy contributions associated with the SRS. For example, the UE 115 may transmit the uplink signal in accordance with individual power limits determined for each antenna or in accordance with one or more common backoff parameters.

Figure 4:
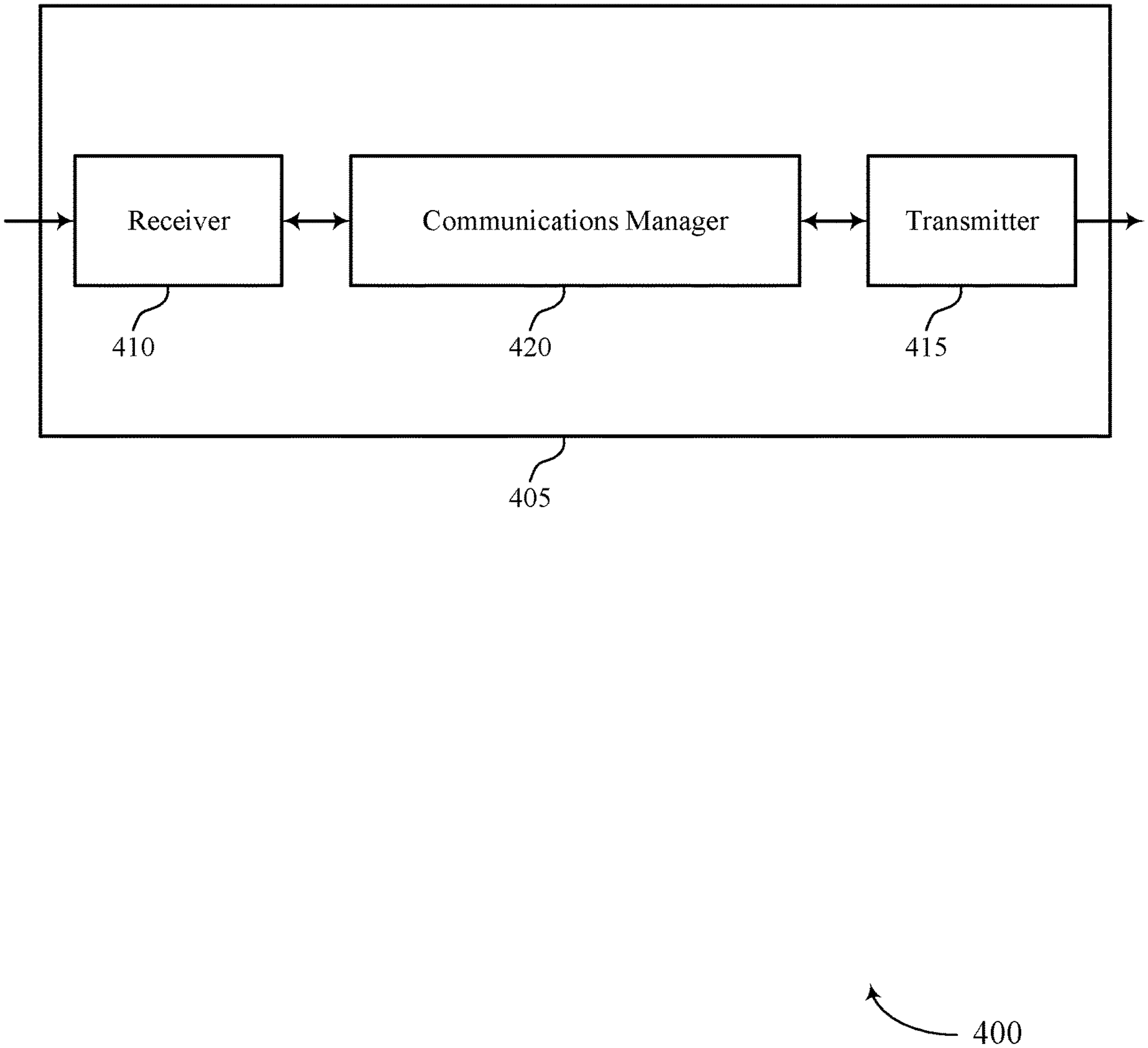
FIGS. 4 and 5 show block diagrams of devices that support techniques for accounting for energy contributions from SRS transmissions over multiple antenna groups towards an exposure limit in accordance with various aspects of the present disclosure.

FIG. 4 shows a block diagram 400 of a device 405 that supports techniques for accounting for energy contributions from SRS transmissions over multiple antenna groups towards an exposure limit in accordance with various aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for accounting for energy contributions from SRS transmissions over multiple antenna groups towards an exposure limit). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for accounting for energy contributions from SRS transmissions over multiple antenna groups towards an exposure limit). In some examples, the transmitter 415 may be co-located with a receiver 410 in a transceiver component. The transmitter 415 may utilize a single antenna or a set of multiple antennas.

The communications manager 420, the receiver 410, the transmitter 415, or various combinations thereof or various components thereof may be examples of means for performing various aspects of techniques for accounting for energy contributions from SRS transmissions over multiple antenna groups towards an exposure limit as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for selecting, for transmission of an SRS, a first set of antennas, where the first set of antennas are selected from at least one first antenna of a first antenna group of the UE that is associated with a first exposure constraint and at least one second antenna of a second antenna group of the UE that is associated with a second exposure constraint. The communications manager 420 may be configured as or otherwise support a means for transmitting, to a base station via the first set of antennas, the SRS over one or more carrier frequencies in accordance with a first transmit power. The communications manager 420 may be configured as or otherwise support a means for determining energy contributions associated with the SRS towards the first exposure constraint and the second exposure constraint based on transmitting the SRS. The communications manager 420 may be configured as or otherwise support a means for transmitting, to the base station via one or more antennas of the first antenna group, an uplink signal over a physical uplink channel in accordance with a second transmit power that is based on the energy contributions associated with the SRS.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for reduced processing, reduced power consumption, and more efficient utilization of communication resources.

Figure 5:
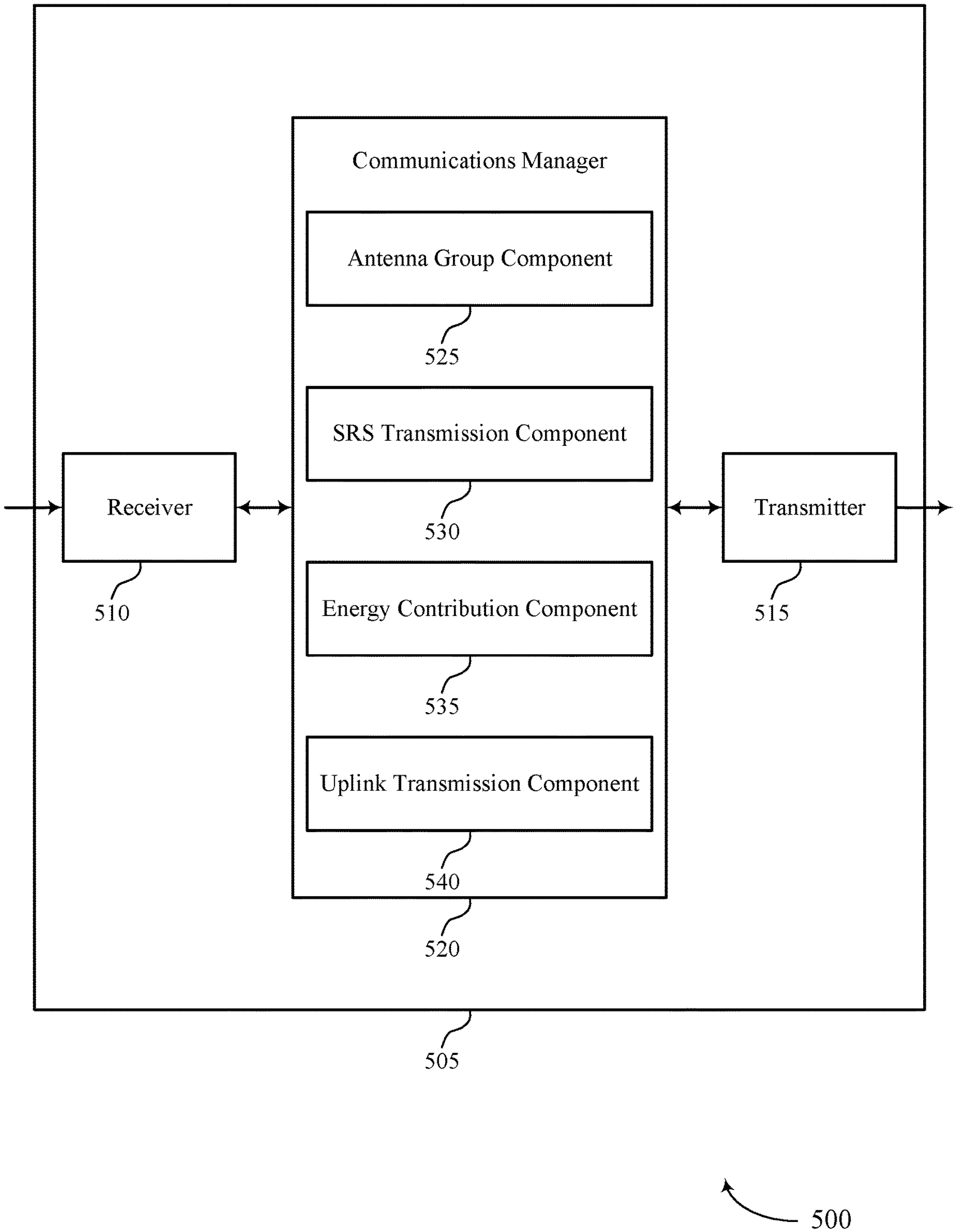

FIG. 5 shows a block diagram 500 of a device 505 that supports techniques for accounting for energy contributions from SRS transmissions over multiple antenna groups towards an exposure limit in accordance with various aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for accounting for energy contributions from SRS transmissions over multiple antenna groups towards an exposure limit). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for accounting for energy contributions from SRS transmissions over multiple antenna groups towards an exposure limit). In some examples, the transmitter 515 may be co-located with a receiver 510 in a transceiver component. The transmitter 515 may utilize a single antenna or a set of multiple antennas.

The device 505, or various components thereof, may be an example of means for performing various aspects of techniques for accounting for energy contributions from SRS transmissions over multiple antenna groups towards an exposure limit as described herein. For example, the communications manager 520 may include an antenna group component 525, an SRS transmission component 530, an energy contribution component 535, an uplink transmission component 540, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The antenna group component 525 may be configured as or otherwise support a means for selecting, for transmission of an SRS, a first set of antennas, where the first set of antennas are selected from at least one first antenna of a first antenna group of the UE that is associated with a first exposure constraint and at least one second antenna of a second antenna group of the UE that is associated with a second exposure constraint. The SRS transmission component 530 may be configured as or otherwise support a means for transmitting, to a base station via the first set of antennas, the SRS over one or more carrier frequencies in accordance with a first transmit power. The energy contribution component 535 may be configured as or otherwise support a means for determining energy contributions associated with the SRS towards the first exposure constraint and the second exposure constraint based on transmitting the SRS. The uplink transmission component 540 may be configured as or otherwise support a means for transmitting, to the base station via one or more antennas of the first antenna group, an uplink signal over a physical uplink channel in accordance with a second transmit power that is based on the energy contributions associated with the SRS.

Figure 6:
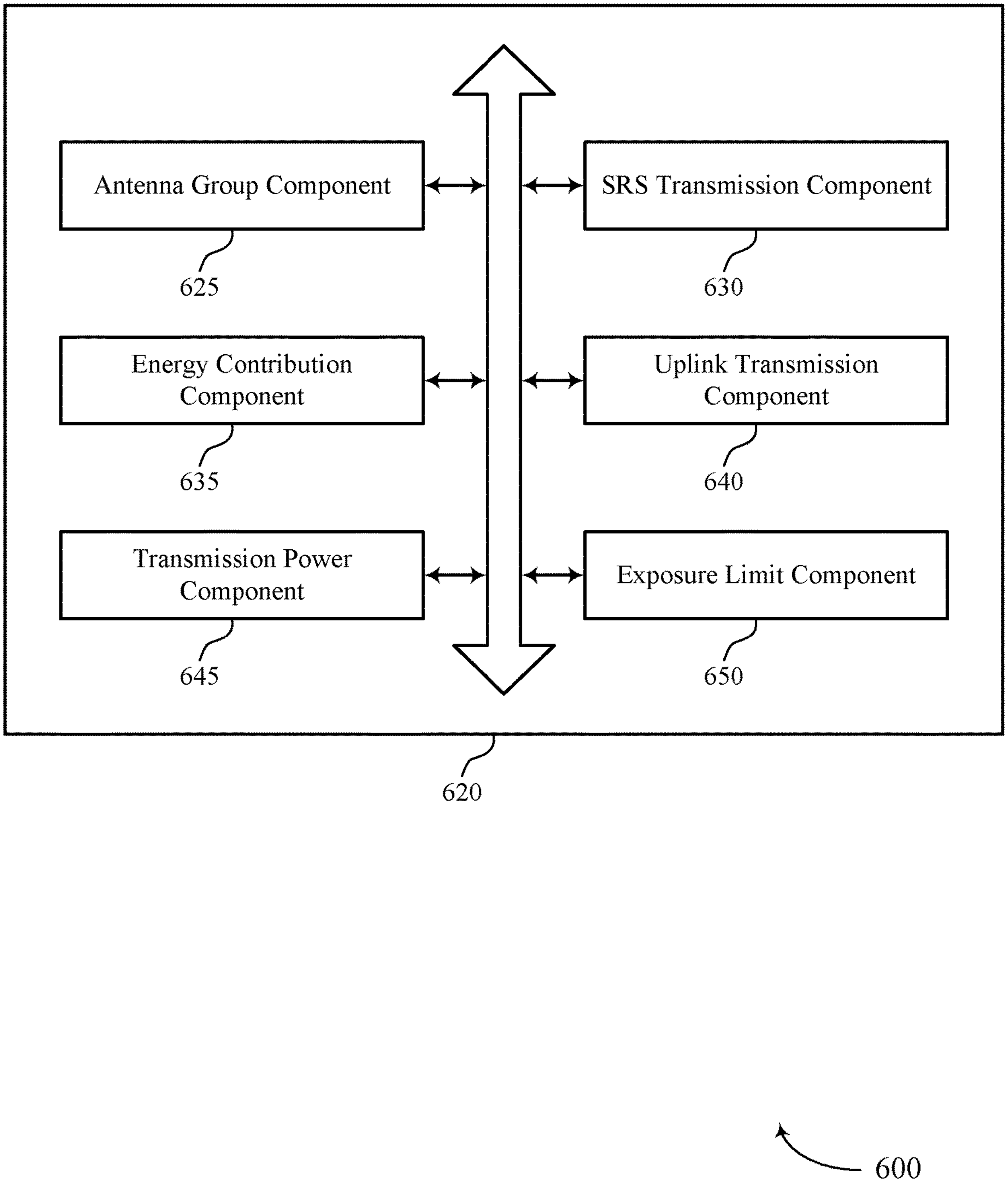
FIG. 6 shows a block diagram of a communications manager that supports techniques for accounting for energy contributions from SRS transmissions over multiple antenna groups towards an exposure limit in accordance with various aspects of the present disclosure.

FIG. 6 shows a block diagram 600 of a communications manager 620 that supports techniques for accounting for energy contributions from SRS transmissions over multiple antenna groups towards an exposure limit in accordance with various aspects of the present disclosure. The communications manager 620 may be an example of aspects of a communications manager 420, a communications manager 520, or both, as described herein. The communications manager 620, or various components thereof, may be an example of means for performing various aspects of techniques for accounting for energy contributions from SRS transmissions over multiple antenna groups towards an exposure limit as described herein. For example, the communications manager 620 may include an antenna group component 625, an SRS transmission component 630, an energy contribution component 635, an uplink transmission component 640, a transmission power component 645, an exposure limit component 650, or any combination thereof. Each of these components may communicate, directly or indirectly, with one another (e.g., via one or more buses).

The communications manager 620 may support wireless communication at a UE in accordance with examples as disclosed herein. The antenna group component 625 may be configured as or otherwise support a means for selecting, for transmission of an SRS, a first set of antennas, where the first set of antennas are selected from at least one first antenna of a first antenna group of the UE that is associated with a first exposure constraint and at least one second antenna of a second antenna group of the UE that is associated with a second exposure constraint. The SRS transmission component 630 may be configured as or otherwise support a means for transmitting, to a base station via the first set of antennas, the SRS over one or more carrier frequencies in accordance with a first transmit power. The energy contribution component 635 may be configured as or otherwise support a means for determining energy contributions associated with the SRS towards the first exposure constraint and the second exposure constraint based on transmitting the SRS. The uplink transmission component 640 may be configured as or otherwise support a means for transmitting, to the base station via one or more antennas of the first antenna group, an uplink signal over a physical uplink channel in accordance with a second transmit power that is based on the energy contributions associated with the SRS.

In some examples, to support determining the energy contributions associated with the SRS, the energy contribution component 635 may be configured as or otherwise support a means for determining a first energy contribution associated with the transmission of the SRS for each antenna of the at least one first antenna of the first antenna group and each carrier frequency of the one or more carrier frequencies. In some examples, to support determining the energy contributions associated with the SRS, the energy contribution component 635 may be configured as or otherwise support a means for determining a second energy contribution associated with the transmission of the SRS for each antenna of the at least one second antenna of the second antenna group and each carrier frequency of the one or more carrier frequencies.

In some examples, the transmission power component 645 may be configured as or otherwise support a means for determining a first power limit for each antenna of the at least one first antenna of the first antenna group and each carrier frequency of the one or more carrier frequencies based on the first energy contribution for that antenna and that carrier frequency. In some examples, the transmission power component 645 may be configured as or otherwise support a means for determining a second power limit for each antenna of the at least one second antenna of the second antenna group and each carrier frequency of the one or more carrier frequencies based on the second energy contribution for that antenna and that carrier frequency.

In some examples, the second transmit power of the uplink signal transmitted via the one or more antennas of the first antenna group is based on determining the first power limit for each antenna of the at least one first antenna of the first antenna group and each carrier frequency of the one or more carrier frequencies.

In some examples, the transmission power component 645 may be configured as or otherwise support a means for determining a first common backoff parameter for antennas of the first antenna group for each carrier frequency of the one or more carrier frequencies based on a first exposure limit associated with the at least one first antenna and determining the first energy contribution for each antenna of the at least one first antenna of the first antenna group and each carrier frequency of the one or more carrier frequencies. In some examples, the transmission power component 645 may be configured as or otherwise support a means for determining a second common backoff parameter for antennas of the second antenna group for each carrier frequency of the one or more carrier frequencies based on a second exposure limit associated with the at least one second antenna and determining the second energy contribution for each antenna of the at least one second antenna of the second antenna group and each carrier frequency of the one or more carrier frequencies.

In some examples, the second transmit power of the uplink signal transmitted via the one or more antennas of the first antenna group is based on determining the first common backoff parameter for the antennas of the first antenna group for each carrier frequency of the one or more carrier frequencies.

In some examples, to support determining the first common backoff parameter, the transmission power component 645 may be configured as or otherwise support a means for determining the first common backoff parameter for the antennas of the first antenna group for each carrier frequency of the one or more carrier frequencies based on applying the first energy contribution for that carrier frequency to the first exposure limit associated with the at least one first antenna.

In some examples, to support determining the second common backoff parameter, the transmission power component 645 may be configured as or otherwise support a means for determining the second common backoff parameter for the antennas of the second antenna group for each carrier frequency of the one or more carrier frequencies based on applying the second energy contribution for that carrier frequency to the second exposure limit associated with the at least one second antenna.

In some examples, to support determining the energy contributions associated with the SRS, the energy contribution component 635 may be configured as or otherwise support a means for determining a first energy contribution associated with an assumed duty cycle for the transmission of the SRS for each carrier frequency of the one or more carrier frequencies. In some examples, the first energy contribution is a largest energy contribution relative to other energy contributions associated with a remainder of possible duty cycles for that carrier frequency in accordance with a configuration of the transmission of the SRS.

In some examples, the transmission power component 645 may be configured as or otherwise support a means for determining a first common backoff parameter for antennas of the first antenna group for each carrier frequency of the one or more carrier frequencies based on a first exposure limit associated with the at least one first antenna and determining the first energy contribution associated with the assumed duty cycle for the transmission of the SRS for each carrier frequency of the one or more carrier frequencies. In some examples, the transmission power component 645 may be configured as or otherwise support a means for determining a second common backoff parameter for antennas of the second antenna group for each carrier frequency of the one or more carrier frequencies based on a second exposure limit associated with the at least one second antenna and determining the first energy contribution associated with the assumed duty cycle for the transmission of the SRS for each carrier frequency of the one or more carrier frequencies.

In some examples, the second transmit power of the uplink signal transmitted via the one or more antennas of the first antenna group is based on determining the first common backoff parameter for the antennas of the first antenna group for each carrier frequency of the one or more carrier frequencies.

In some examples, to support determining the first common backoff parameter, the transmission power component 645 may be configured as or otherwise support a means for determining the first common backoff parameter for the antennas of the first antenna group for each carrier frequency of the one or more carrier frequencies based on applying the first energy contribution for that carrier frequency to the first exposure limit associated with the at least one first antenna.

In some examples, to support determining the second common backoff parameter, the transmission power component 645 may be configured as or otherwise support a means for determining the second common backoff parameter for the antennas of the second antenna group for each carrier frequency of the one or more carrier frequencies based on applying the first energy contribution for that carrier frequency to the second exposure limit associated with the at least one second antenna.

In some examples, the energy contribution component 635 may be configured as or otherwise support a means for determining a second energy contribution associated with an actual duty cycle for the transmission of the SRS in accordance with the configuration of the transmission of the SRS for each carrier frequency of the one or more carrier frequencies. In some examples, the energy contribution component 635 may be configured as or otherwise support a means for comparing the second energy contribution associated with the actual duty cycle with the first energy contribution associated with the assumed duty cycle for at least one carrier frequency of the one or more carrier frequencies.

In some examples, the energy contribution component 635 may be configured as or otherwise support a means for determining that the second energy contribution is greater than the first energy contribution based on the comparing. In some examples, the energy contribution component 635 may be configured as or otherwise support a means for accounting for the energy contributions associated with the transmission of the SRS collectively across the first set of antennas to obtain a total energy contribution for the transmission of the SRS across the first antenna group and the second antenna group, where the second transmit power is based on the total energy contribution.

In some examples, the energy contribution component 635 may be configured as or otherwise support a means for determining that the second energy contribution is greater than the first energy contribution based on the comparing. In some examples, the SRS transmission component 630 may be configured as or otherwise support a means for skipping one or more SRS transmissions based on determining that the second energy contribution is greater than the first energy contribution.

In some examples, to support transmitting the SRS in accordance with the first transmit power, the SRS transmission component 630 may be configured as or otherwise support a means for transmitting the SRS in accordance with the first transmit power based on an exposure limit of the UE.

In some examples, to support transmitting the SRS in accordance with the first transmit power based on the exposure limit of the UE, the exposure limit component 650 may be configured as or otherwise support a means for applying the exposure limit to first SRS transmissions absent of carrier switching. In some examples, to support transmitting the SRS in accordance with the first transmit power based on the exposure limit of the UE, the exposure limit component 650 may be configured as or otherwise support a means for refraining from applying the exposure limit to second SRS transmissions associated with carrier switching.

In some examples, to support transmitting the SRS in accordance with the first transmit power based on the exposure limit of the UE, the exposure limit component 650 may be configured as or otherwise support a means for applying the exposure limit to first SRS transmissions via the at least one first antenna of the first antenna group. In some examples, to support transmitting the SRS in accordance with the first transmit power based on the exposure limit of the UE, the exposure limit component 650 may be configured as or otherwise support a means for refraining from applying the exposure limit to second SRS transmissions via the at least one second antenna of the second antenna group.

In some examples, to support transmitting the SRS in accordance with the first transmit power, the SRS transmission component 630 may be configured as or otherwise support a means for transmitting the SRS in accordance with the first transmit power irrespective of an exposure limit of the UE.

In some examples, the UE uses antennas of the first antenna group for physical uplink channel transmissions and refrains from using antennas of the second antenna group for the physical uplink channel transmissions. In some examples, the first antenna group of the UE includes a first number of antennas located at a first location on the UE and the second antenna group of the UE includes a second number of antennas located at a second location on the UE.

Figure 7:
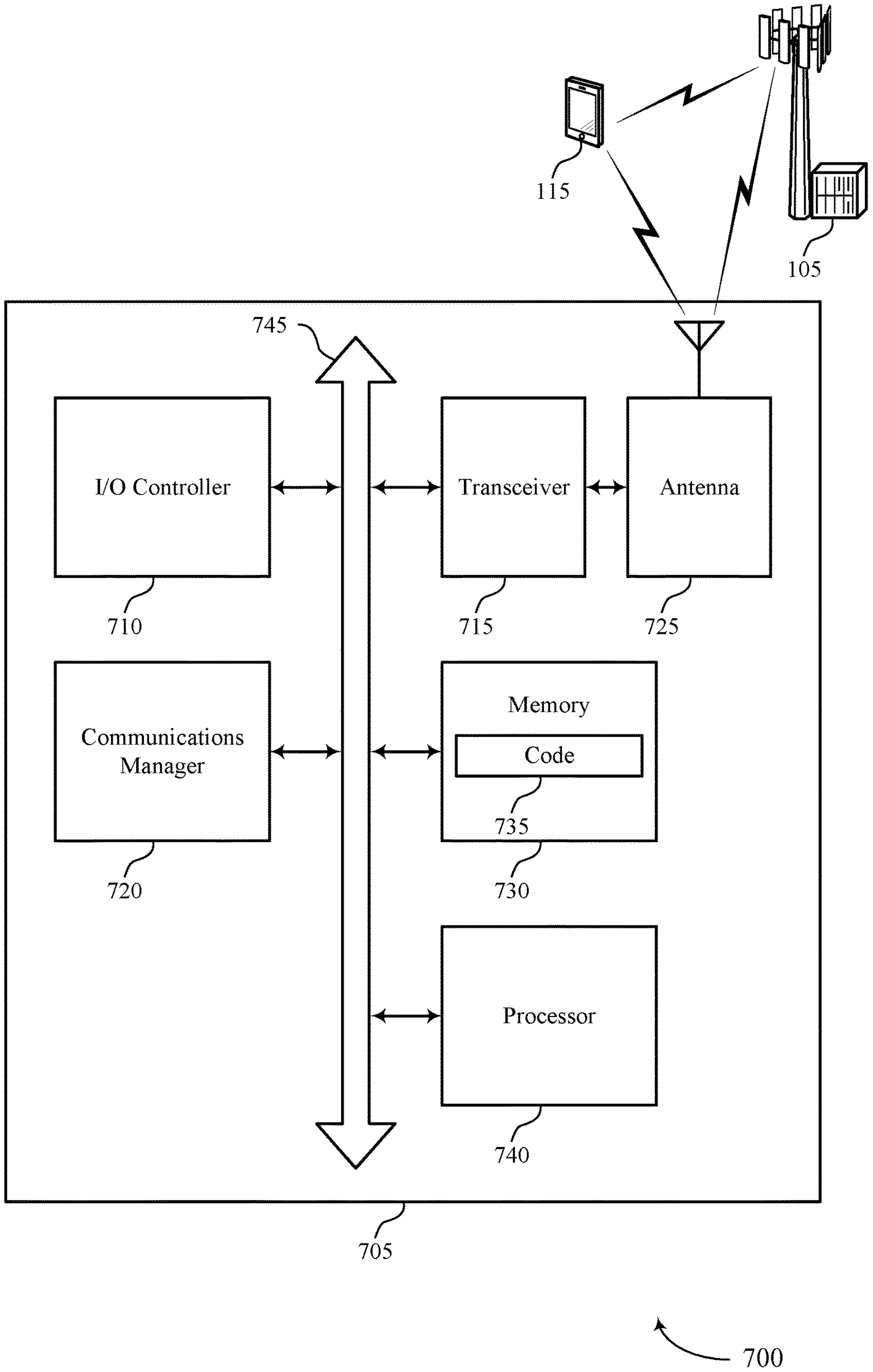
FIG. 7 shows a diagram of a system including a device that supports techniques for accounting for energy contributions from SRS transmissions over multiple antenna groups towards an exposure limit in accordance with various aspects of the present disclosure.

FIG. 7 shows a diagram of a system 700 including a device 705 that supports techniques for accounting for energy contributions from SRS transmissions over multiple antenna groups towards an exposure limit in accordance with various aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for accounting for energy contributions from SRS transmissions over multiple antenna groups towards an exposure limit). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for selecting, for transmission of an SRS, a first set of antennas, where the first set of antennas are selected from at least one first antenna of a first antenna group of the UE that is associated with a first exposure constraint and at least one second antenna of a second antenna group of the UE that is associated with a second exposure constraint. The communications manager 720 may be configured as or otherwise support a means for transmitting, to a base station via the first set of antennas, the SRS over one or more carrier frequencies in accordance with a first transmit power. The communications manager 720 may be configured as or otherwise support a means for determining energy contributions associated with the SRS towards the first exposure constraint and the second exposure constraint based on transmitting the SRS. The communications manager 720 may be configured as or otherwise support a means for transmitting, to the base station via one or more antennas of the first antenna group, an uplink signal over a physical uplink channel in accordance with a second transmit power that is based on the energy contributions associated with the SRS.

By including or configuring the communications manager 720 in accordance with examples as described herein, the device 705 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for accounting for energy contributions from SRS transmissions over multiple antenna groups towards an exposure limit as described herein, or the processor 740 and the memory 730 may be otherwise configured to perform or support such operations.

Figure 8:
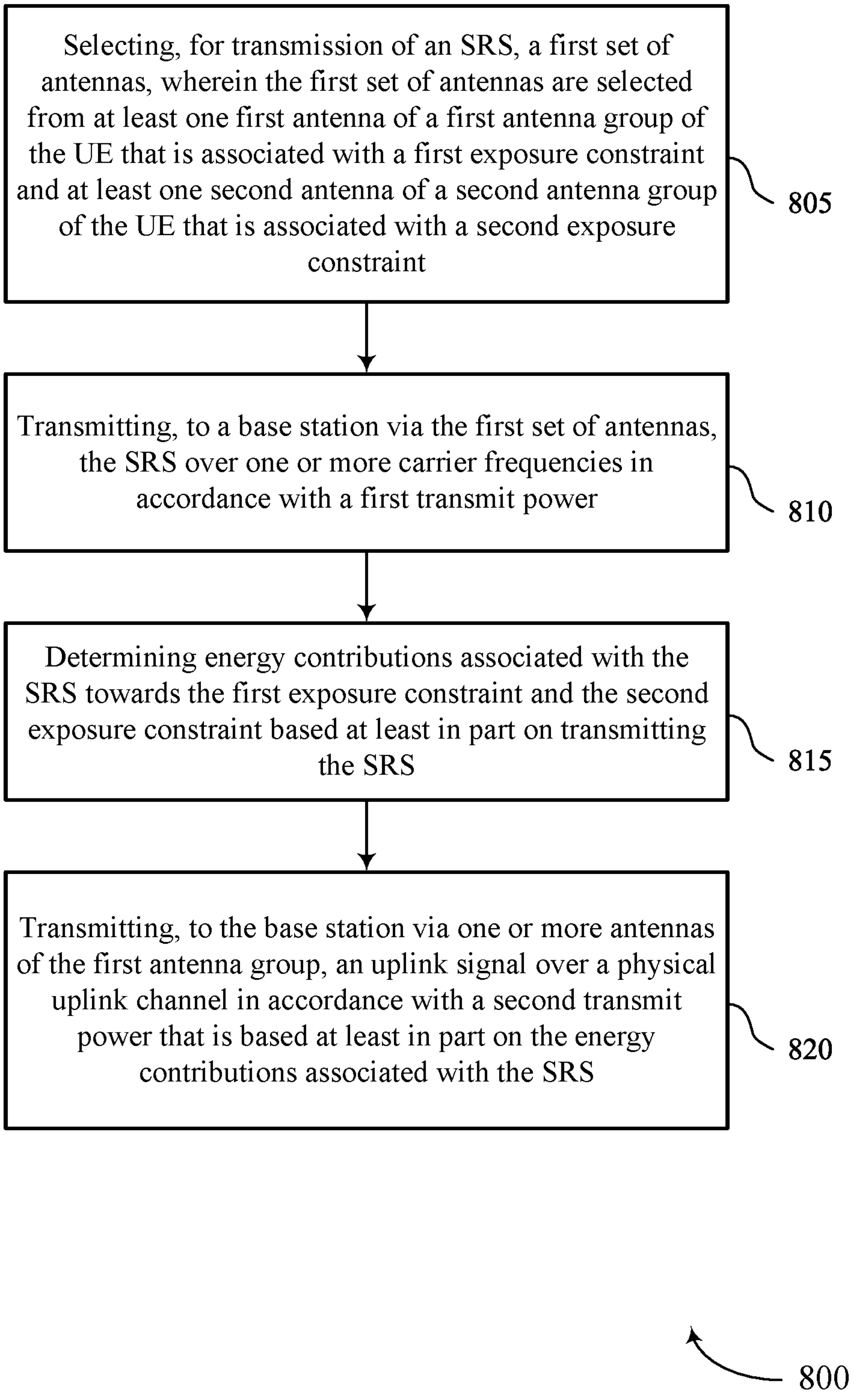
FIGS. 8 through 10 show flowcharts illustrating methods that support techniques for accounting for energy contributions from SRS transmissions over multiple antenna groups towards an exposure limit in accordance with various aspects of the present disclosure.

FIG. 8 shows a flowchart illustrating a method 800 that supports techniques for accounting for energy contributions from SRS transmissions over multiple antenna groups towards an exposure limit in accordance with various aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 805, the method may include selecting, for transmission of an SRS, a first set of antennas, where the first set of antennas are selected from at least one first antenna of a first antenna group of the UE that is associated with a first exposure constraint and at least one second antenna of a second antenna group of the UE that is associated with a second exposure constraint. The operations of 805 may be performed in accordance with examples as disclosed herein. In some examples, aspects of the operations of 805 may be performed by an antenna group component 625 as described with reference to FIG. 6.

At 810, the method may include transmitting, to a base station via the first set of antennas, the SRS over one or more carrier frequencies in accordance with a first transmit power. The operations of 810 may be performed in accordance with examples as disclosed herein. In some examples, aspects of the operations of 810 may be performed by an SRS transmission component 630 as described with reference to FIG. 6.

At 815, the method may include determining energy contributions associated with the SRS towards the first exposure constraint and the second exposure constraint based on transmitting the SRS. The operations of 815 may be performed in accordance with examples as disclosed herein. In some examples, aspects of the operations of 815 may be performed by an energy contribution component 635 as described with reference to FIG. 6.

At 820, the method may include transmitting, to the base station via one or more antennas of the first antenna group, an uplink signal over a physical uplink channel in accordance with a second transmit power that is based on the energy contributions associated with the SRS. The operations of 820 may be performed in accordance with examples as disclosed herein. In some examples, aspects of the operations of 820 may be performed by an uplink transmission component 640 as described with reference to FIG. 6.

Figure 9:
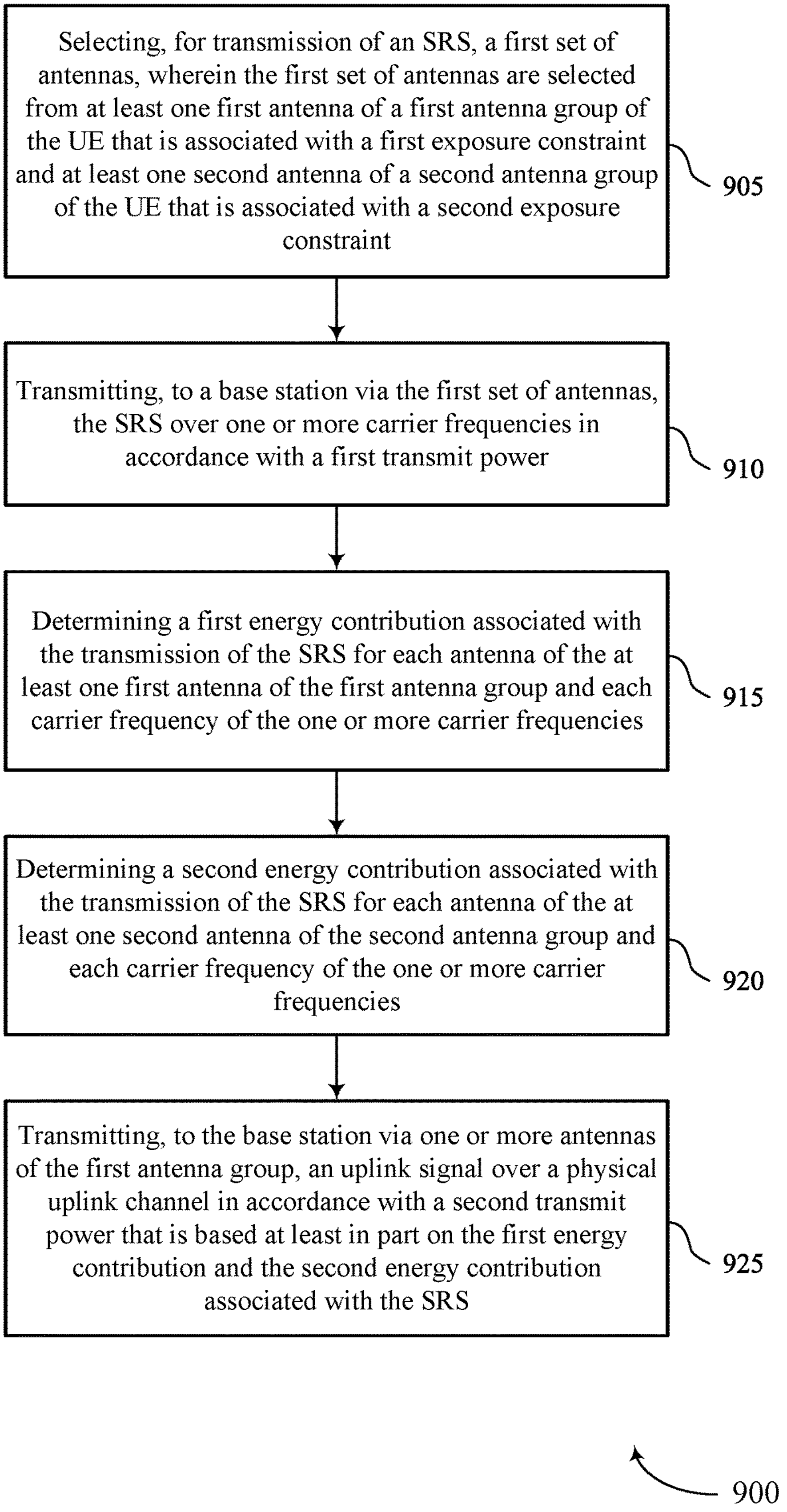

FIG. 9 shows a flowchart illustrating a method 900 that supports techniques for accounting for energy contributions from SRS transmissions over multiple antenna groups towards an exposure limit in accordance with various aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 905, the method may include selecting, for transmission of an SRS, a first set of antennas, where the first set of antennas are selected from at least one first antenna of a first antenna group of the UE that is associated with a first exposure constraint and at least one second antenna of a second antenna group of the UE that is associated with a second exposure constraint. The operations of 905 may be performed in accordance with examples as disclosed herein. In some examples, aspects of the operations of 905 may be performed by an antenna group component 625 as described with reference to FIG. 6.

At 910, the method may include transmitting, to a base station via the first set of antennas, the SRS over one or more carrier frequencies in accordance with a first transmit power. The operations of 910 may be performed in accordance with examples as disclosed herein. In some examples, aspects of the operations of 910 may be performed by an SRS transmission component 630 as described with reference to FIG. 6.

At 915, the method may include determining a first energy contribution associated with the transmission of the SRS for each antenna of the at least one first antenna of the first antenna group and each carrier frequency of the one or more carrier frequencies. The operations of 915 may be performed in accordance with examples as disclosed herein. In some examples, aspects of the operations of 915 may be performed by an energy contribution component 635 as described with reference to FIG. 6.

At 920, the method may include determining a second energy contribution associated with the transmission of the SRS for each antenna of the at least one second antenna of the second antenna group and each carrier frequency of the one or more carrier frequencies. The operations of 920 may be performed in accordance with examples as disclosed herein. In some examples, aspects of the operations of 920 may be performed by an energy contribution component 635 as described with reference to FIG. 6.

At 925, the method may include transmitting, to the base station via one or more antennas of the first antenna group, an uplink signal over a physical uplink channel in accordance with a second transmit power that is based at least in part on the first energy contribution and the second energy contribution associated with the SRS. The operations of 925 may be performed in accordance with examples as disclosed herein. In some examples, aspects of the operations of 925 may be performed by an uplink transmission component 640 as described with reference to FIG. 6.

Figure 10:
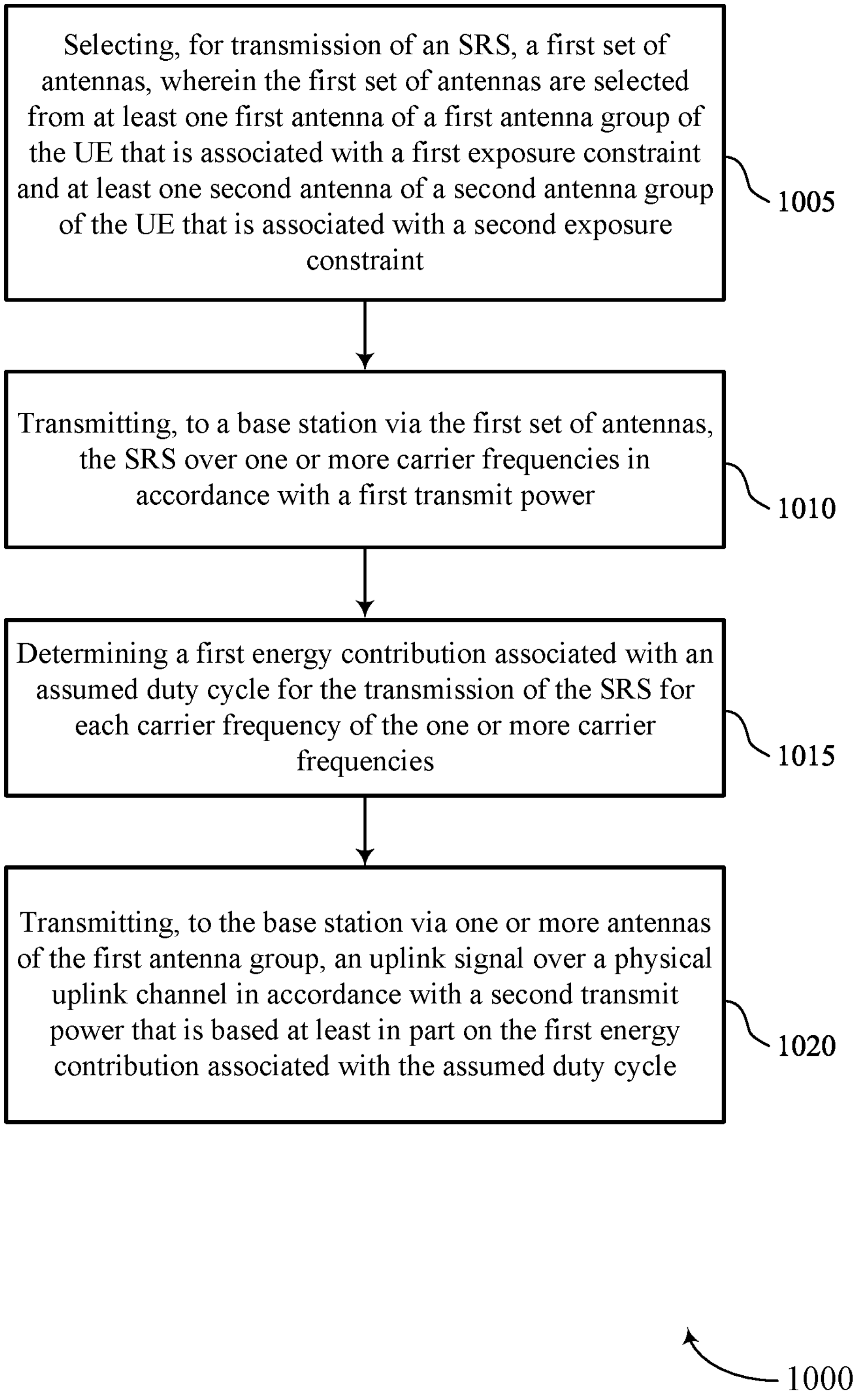

FIG. 10 shows a flowchart illustrating a method 1000 that supports techniques for accounting for energy contributions from SRS transmissions over multiple antenna groups towards an exposure limit in accordance with various aspects of the present disclosure. The operations of the method 1000 may be implemented by a UE or its components as described herein. For example, the operations of the method 1000 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1005, the method may include selecting, for transmission of an SRS, a first set of antennas, where the first set of antennas are selected from at least one first antenna of a first antenna group of the UE that is associated with a first exposure constraint and at least one second antenna of a second antenna group of the UE that is associated with a second exposure constraint. The operations of 1005 may be performed in accordance with examples as disclosed herein. In some examples, aspects of the operations of 1005 may be performed by an antenna group component 625 as described with reference to FIG. 6.

At 1010, the method may include transmitting, to a base station via the first set of antennas, the SRS over one or more carrier frequencies in accordance with a first transmit power. The operations of 1010 may be performed in accordance with examples as disclosed herein. In some examples, aspects of the operations of 1010 may be performed by an SRS transmission component 630 as described with reference to FIG. 6.

At 1015, the method may include determining a first energy contribution associated with an assumed duty cycle for the transmission of the SRS for each carrier frequency of the one or more carrier frequencies. The operations of 1015 may be performed in accordance with examples as disclosed herein. In some examples, aspects of the operations of 1015 may be performed by an energy contribution component 635 as described with reference to FIG. 6.

At 1020, the method may include transmitting, to the base station via one or more antennas of the first antenna group, an uplink signal over a physical uplink channel in accordance with a second transmit power that is based at least in part on the first energy contribution associated with the assumed duty cycle. The operations of 1020 may be performed in accordance with examples as disclosed herein. In some examples, aspects of the operations of 1020 may be performed by an uplink transmission component 640 as described with reference to FIG. 6.

The following provides an overview of aspects of the present disclosure:

Aspect 1: A method for wireless communication at a UE, comprising: selecting, for transmission of an SRS, a first set of antennas, wherein the first set of antennas are selected from at least one first antenna of a first antenna group of the UE that is associated with a first exposure constraint and at least one second antenna of a second antenna group of the UE that is associated with a second exposure constraint; transmitting, to a base station via the first set of antennas, the SRS over one or more carrier frequencies in accordance with a first transmit power; determining energy contributions associated with the SRS towards the first exposure constraint and the second exposure constraint based at least in part on transmitting the SRS; and transmitting, to the base station via one or more antennas of the first antenna group, an uplink signal over a physical uplink channel in accordance with a second transmit power that is based at least in part on the energy contributions associated with the SRS.

Aspect 2: The method of aspect 1, wherein determining the energy contributions associated with the SRS comprises: determining a first energy contribution associated with the transmission of the SRS for each antenna of the at least one first antenna of the first antenna group and each carrier frequency of the one or more carrier frequencies; and determining a second energy contribution associated with the transmission of the SRS for each antenna of the at least one second antenna of the second antenna group and each carrier frequency of the one or more carrier frequencies.

Aspect 3: The method of aspect 2, further comprising: determining a first power limit for each antenna of the at least one first antenna of the first antenna group and each carrier frequency of the one or more carrier frequencies based at least in part on the first energy contribution for that antenna and that carrier frequency; and determining a second power limit for each antenna of the at least one second antenna of the second antenna group and each carrier frequency of the one or more carrier frequencies based at least in part on the second energy contribution for that antenna and that carrier frequency.

Aspect 4: The method of aspect 3, wherein the second transmit power of the uplink signal transmitted via the one or more antennas of the first antenna group is based at least in part on determining the first power limit for each antenna of the at least one first antenna of the first antenna group and each carrier frequency of the one or more carrier frequencies.

Aspect 5: The method of any of aspects 2 through 4, further comprising: determining a first common backoff parameter for antennas of the first antenna group for each carrier frequency of the one or more carrier frequencies based at least in part on a first exposure limit associated with the at least one first antenna and determining the first energy contribution for each antenna of the at least one first antenna of the first antenna group and each carrier frequency of the one or more carrier frequencies; and determining a second common backoff parameter for antennas of the second antenna group for each carrier frequency of the one or more carrier frequencies based at least in part on a second exposure limit associated with the at least one second antenna and determining the second energy contribution for each antenna of the at least one second antenna of the second antenna group and each carrier frequency of the one or more carrier frequencies.

Aspect 6: The method of aspect 5, wherein the second transmit power of the uplink signal transmitted via the one or more antennas of the first antenna group is based at least in part on determining the first common backoff parameter for the antennas of the first antenna group for each carrier frequency of the one or more carrier frequencies.

Aspect 7: The method of any of aspects 5 or 6, wherein determining the first common backoff parameter comprises: determining the first common backoff parameter for the antennas of the first antenna group for each carrier frequency of the one or more carrier frequencies based at least in part on applying the first energy contribution for that carrier frequency to the first exposure limit associated with the at least one first antenna.

Aspect 8: The method of any of aspects 5 through 7, wherein determining the second common backoff parameter comprises: determining the second common backoff parameter for the antennas of the second antenna group for each carrier frequency of the one or more carrier frequencies based at least in part on applying the second energy contribution for that carrier frequency to the second exposure limit associated with the at least one second antenna.

Aspect 9: The method of any of aspects 1 through 8, wherein determining the energy contributions associated with the SRS comprises: determining a first energy contribution associated with an assumed duty cycle for the transmission of the SRS for each carrier frequency of the one or more carrier frequencies.

Aspect 10: The method of aspect 9, wherein the first energy contribution is a largest energy contribution relative to other energy contributions associated with a remainder of possible duty cycles for that carrier frequency in accordance with a configuration of the transmission of the SRS.

Aspect 11: The method of any of aspects 9 or 10, further comprising: determining a first common backoff parameter for antennas of the first antenna group for each carrier frequency of the one or more carrier frequencies based at least in part on a first exposure limit associated with the at least one first antenna and determining the first energy contribution associated with the assumed duty cycle for the transmission of the SRS for each carrier frequency of the one or more carrier frequencies; and determining a second common backoff parameter for antennas of the second antenna group for each carrier frequency of the one or more carrier frequencies based at least in part on a second exposure limit associated with the at least one second antenna and determining the first energy contribution associated with the assumed duty cycle for the transmission of the SRS for each carrier frequency of the one or more carrier frequencies.

Aspect 12: The method of aspect 11, wherein the second transmit power of the uplink signal transmitted via the one or more antennas of the first antenna group is based at least in part on determining the first common backoff parameter for the antennas of the first antenna group for each carrier frequency of the one or more carrier frequencies.

Aspect 13: The method of any of aspects 11 or 12, wherein determining the first common backoff parameter comprises: determining the first common backoff parameter for the antennas of the first antenna group for each carrier frequency of the one or more carrier frequencies based at least in part on applying the first energy contribution for that carrier frequency to the first exposure limit associated with the at least one first antenna.

Aspect 14: The method of any of aspects 11 through 13, wherein determining the second common backoff parameter comprises: determining the second common backoff parameter for the antennas of the second antenna group for each carrier frequency of the one or more carrier frequencies based at least in part on applying the first energy contribution for that carrier frequency to the second exposure limit associated with the at least one second antenna.

Aspect 15: The method of any of aspects 9 through 14, further comprising: determining a second energy contribution associated with an actual duty cycle for the transmission of the SRS in accordance with the configuration of the transmission of the SRS for each carrier frequency of the one or more carrier frequencies; and comparing the second energy contribution associated with the actual duty cycle with the first energy contribution associated with the assumed duty cycle for at least one carrier frequency of the one or more carrier frequencies.

Aspect 16: The method of aspect 15, further comprising: determining that the second energy contribution is greater than the first energy contribution based at least in part on the comparing; and accounting for the energy contributions associated with the transmission of the SRS collectively across the first set of antennas to obtain a total energy contribution for the transmission of the SRS across the first antenna group and the second antenna group, wherein the second transmit power is based at least in part on the total energy contribution.

Aspect 17: The method of any of aspects 15 or 16, further comprising: determining that the second energy contribution is greater than the first energy contribution based at least in part on the comparing; and skipping one or more SRS transmissions based at least in part on determining that the second energy contribution is greater than the first energy contribution.

Aspect 18: The method of any of aspects 1 through 17, wherein transmitting the SRS in accordance with the first transmit power comprises: transmitting the SRS in accordance with the first transmit power based at least in part on an exposure limit of the UE.

Aspect 19: The method of aspect 18, wherein transmitting the SRS in accordance with the first transmit power based at least in part on the exposure limit of the UE comprises: applying the exposure limit to first SRS transmissions absent of carrier switching; and refraining from applying the exposure limit to second SRS transmissions associated with carrier switching.

Aspect 20: The method of any of aspects 18 or 19, wherein transmitting the SRS in accordance with the first transmit power based at least in part on the exposure limit of the UE comprises: applying the exposure limit to first SRS transmissions via the at least one first antenna of the first antenna group; and refraining from applying the exposure limit to second SRS transmissions via the at least one second antenna of the second antenna group.

Aspect 21: The method of any of aspects 1 through 17, wherein transmitting the SRS in accordance with the first transmit power comprises: transmitting the SRS in accordance with the first transmit power irrespective of an exposure limit of the UE.

Aspect 22: The method of any of aspects 1 through 21, wherein the UE uses antennas of the first antenna group for physical uplink channel transmissions and refrains from using antennas of the second antenna group for the physical uplink channel transmissions.

Aspect 23: The method of any of aspects 1 through 22, wherein the first antenna group of the UE includes a first number of antennas located at a first location on the UE and the second antenna group of the UE includes a second number of antennas located at a second location on the UE.

Aspect 24: An apparatus for wireless communication at a UE, comprising a processor; memory coupled with the processor; and instructions stored in the memory and executable by the processor to cause the apparatus to perform a method of any of aspects 1 through 23.

Aspect 25: An apparatus for wireless communication at a UE, comprising at least one means for performing a method of any of aspects 1 through 23.

Aspect 26: A non-transitory computer-readable medium storing code for wireless communication at a UE, the code comprising instructions executable by a processor to perform a method of any of aspects 1 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

transmitting, using a first antenna of a first antenna group and a second antenna of a second antenna group, a sounding reference signal via one or more carrier frequencies; and transmitting, subsequent to transmitting the sounding reference signal and using one or more antennas of the first antenna group, an uplink signal via a physical uplink channel in accordance with a transmit power that is based at least in part on a first energy contribution associated with the transmission of the sounding reference signal via the first antenna of the first antenna group, and a second energy contribution associated with the transmission of the sounding reference signal via the second antenna of the second antenna group.

2. The method of claim 1, further comprising:

monitoring, for each carrier of the one or more carrier frequencies, one or more first energy contributions associated with the first antenna group and one or more second energy contributions associated with the second antenna group, wherein transmitting the uplink signal via the physical uplink channel in accordance with the transmit power is based at least in part on the monitoring.

3. The method of claim 2, wherein the monitoring comprises:

monitoring, for a first carrier frequency of the one or more carrier frequencies, a first respective first energy contribution associated with the first antenna group and a first respective second energy contribution associated with the second antenna group; and monitoring, for a second carrier frequency of the one or more carrier frequencies that is different than the first carrier frequency, a second respective first energy contribution associated with the first antenna group and a second respective second energy contribution associated with the second antenna group.

4. The method of claim 1, wherein:

a first power limit for each first antenna of the first antenna group and each carrier frequency of the one or more carrier frequencies is based at least in part on a respective first energy contribution for that antenna and that carrier frequency; and a second power limit for each second antenna of the second antenna group and each carrier frequency of the one or more carrier frequencies is based at least in part on a respective second energy contribution for that antenna and that carrier frequency.

5. The method of claim 4, wherein transmitting the uplink signal using the one or more antennas of the first antenna group in accordance with the transmit power comprises:

transmitting the uplink signal using the one or more antennas of the first antenna group based at least in part on the first power limit for each first antenna of the first antenna group and each carrier frequency of the one or more carrier frequencies.

6. The method of claim 1, wherein transmitting the sounding reference signal comprises:

transmitting the sounding reference signal based at least in part on an exposure limit of the UE.

7. The method of claim 6, wherein the exposure limit is based at least in part on a specific absorption rate (SAR) limit or a maximum permissible exposure (MPE) limit associated with the physical uplink channel, or is based at least in part on a maximum transmit power level (MTPL) that is different than the SAR limit or the MPE limit.

8. The method of claim 6, wherein transmitting the sounding reference signal based at least in part on the exposure limit of the UE comprises:

transmitting one or more first sounding reference signal transmissions not associated with carrier switching in accordance with the exposure limit; and transmitting one or more second sounding reference signal transmissions associated with carrier switching in accordance with a second exposure limit that is different than the exposure limit.

9. The method of claim 6, wherein transmitting the sounding reference signal based at least in part on the exposure limit of the UE comprises:

transmitting one or more first sounding reference signal transmissions using the first antenna group and via the physical uplink channel in accordance with the exposure limit; and transmitting one or more second sounding reference signal transmissions using the second antenna group in accordance with a second exposure limit that is different than the exposure limit.

10. The method of claim 1, wherein transmitting the sounding reference signal comprises:

transmitting the sounding reference signal in accordance with a second exposure limit that is different than an exposure limit associated with the physical uplink channel.

11. A user equipment (UE), comprising:

one or more memories storing processor-executable code; and one or more processors coupled with the one or more memories and individually or collectively operable to execute the code to cause the UE to:

transmit, using a first antenna of a first antenna group and a second antenna of a second antenna group, a sounding reference signal via one or more carrier frequencies; and transmit, subsequent to transmitting the sounding reference signal and using one or more antennas of the first antenna group, an uplink signal via a physical uplink channel in accordance with a transmit power that is based at least in part on a first energy contribution associated with the transmission of the sounding reference signal via the first antenna of the first antenna group, and a second energy contribution associated with the transmission of the sounding reference signal via the second antenna of the second antenna group.

12. The UE of claim 11, wherein the one or more processors are individually or collectively further operable to execute the code to cause the UE to:

monitor, for each carrier of the one or more carrier frequencies, one or more first energy contributions associated with the first antenna group and one or more second energy contributions associated with the second antenna group, wherein transmitting the uplink signal via the physical uplink channel in accordance with the transmit power is based at least in part on the monitoring.

13. The UE of claim 12, wherein, to monitor, the one or more processors are individually or collectively operable to execute the code to cause the UE to:

monitor, for a first carrier frequency of the one or more carrier frequencies, a first respective first energy contribution associated with the first antenna group and a first respective second energy contribution associated with the second antenna group; and monitor, for a second carrier frequency of the one or more carrier frequencies that is different than the first carrier frequency, a second respective first energy contribution associated with the first antenna group and a second respective second energy contribution associated with the second antenna group.

14. The UE of claim 11, wherein:

a first power limit for each first antenna of the first antenna group and each carrier frequency of the one or more carrier frequencies is based at least in part on a respective first energy contribution for that antenna and that carrier frequency; and a second power limit for each second antenna of the second antenna group and each carrier frequency of the one or more carrier frequencies is based at least in part on a respective second energy contribution for that antenna and that carrier frequency.

15. The UE of claim 14, wherein, to transmit the uplink signal using the one or more antennas of the first antenna group in accordance with the transmit power, the one or more processors are individually or collectively operable to execute the code to cause the UE to:

transmit the uplink signal using the one or more antennas of the first antenna group based at least in part on the first power limit for each first antenna of the first antenna group and each carrier frequency of the one or more carrier frequencies.

16. The UE of claim 11, wherein, to transmit the sounding reference signal, the one or more processors are individually or collectively operable to execute the code to cause the UE to:

transmit the sounding reference signal based at least in part on an exposure limit of the UE.

17. The UE of claim 16, wherein the exposure limit is based at least in part on a specific absorption rate (SAR) limit or a maximum permissible exposure (MPE) limit associated with the physical uplink channel, or is based at least in part on a maximum transmit power level (MTPL) that is different than the SAR limit or the MPE limit.

18. The UE of claim 16, wherein, to transmit the sounding reference signal based at least in part on the exposure limit of the UE, the one or more processors are individually or collectively operable to execute the code to cause the UE to:

transmit one or more first sounding reference signal transmissions not associated with carrier switching in accordance with the exposure limit; and transmit one or more second sounding reference signal transmissions associated with carrier switching in accordance with a second exposure limit that is different than the exposure limit.

19. The UE of claim 16, wherein, to transmit the sounding reference signal based at least in part on the exposure limit of the UE, the one or more processors are individually or collectively operable to execute the code to cause the UE to:

transmit one or more first sounding reference signal transmissions using the first antenna group and via the physical uplink channel in accordance with the exposure limit; and transmit one or more second sounding reference signal transmissions using the second antenna group in accordance with a second exposure limit that is different than the exposure limit.

20. The UE of claim 11, wherein, to transmit the sounding reference signal, the one or more processors are individually or collectively operable to execute the code to cause the UE to:

transmit the sounding reference signal in accordance with a second exposure limit that is different than an exposure limit associated with the physical uplink channel.

21. A user equipment (UE), comprising:

means for transmitting, using a first antenna of a first antenna group and a second antenna of a second antenna group, a sounding reference signal via one or more carrier frequencies; and means for transmitting, subsequent to transmitting the sounding reference signal and using one or more antennas of the first antenna group, an uplink signal via a physical uplink channel in accordance with a transmit power that is based at least in part on a first energy contribution associated with the transmission of the sounding reference signal via the first antenna of the first antenna group, and a second energy contribution associated with the transmission of the sounding reference signal via the second antenna of the second antenna group.

22. The UE of claim 21, further comprising:

means for monitoring, for each carrier of the one or more carrier frequencies, one or more first energy contributions associated with the first antenna group and one or more second energy contributions associated with the second antenna group, wherein transmitting the uplink signal via the physical uplink channel in accordance with the transmit power is based at least in part on the monitoring.

23. The UE of claim 21, wherein:

a first power limit for each first antenna of the first antenna group and each carrier frequency of the one or more carrier frequencies is based at least in part on a respective first energy contribution for that antenna and that carrier frequency; and a second power limit for each second antenna of the second antenna group and each carrier frequency of the one or more carrier frequencies is based at least in part on a respective second energy contribution for that antenna and that carrier frequency.

24. The UE of claim 23, wherein the means for transmitting the uplink signal using the one or more antennas of the first antenna group in accordance with the transmit power comprise:

means for transmitting the uplink signal using the one or more antennas of the first antenna group based at least in part on the first power limit for each first antenna of the first antenna group and each carrier frequency of the one or more carrier frequencies.

25. The UE of claim 21, wherein the means for transmitting the sounding reference signal comprise:

means for transmitting the sounding reference signal based at least in part on an exposure limit of the UE.

26. A non-transitory computer-readable medium storing code, the code comprising instructions executable by one or more processors to:

transmit, using a first antenna of a first antenna group and a second antenna of a second antenna group, a sounding reference signal via one or more carrier frequencies; and transmit, subsequent to transmitting the sounding reference signal and using one or more antennas of the first antenna group, an uplink signal via a physical uplink channel in accordance with a transmit power that is based at least in part on a first energy contribution associated with the transmission of the sounding reference signal via the first antenna of the first antenna group, and a second energy contribution associated with the transmission of the sounding reference signal via the second antenna of the second antenna group.

27. The non-transitory computer-readable medium of claim 26, wherein the instructions are further executable by the one or more processors to:

monitor, for each carrier of the one or more carrier frequencies, one or more first energy contributions associated with the first antenna group and one or more second energy contributions associated with the second antenna group, wherein transmitting the uplink signal via the physical uplink channel in accordance with the transmit power is based at least in part on the monitoring.

28. The non-transitory computer-readable medium of claim 26, wherein:

a first power limit for each first antenna of the first antenna group and each carrier frequency of the one or more carrier frequencies is based at least in part on a respective first energy contribution for that antenna and that carrier frequency; and a second power limit for each second antenna of the second antenna group and each carrier frequency of the one or more carrier frequencies is based at least in part on a respective second energy contribution for that antenna and that carrier frequency.

29. The non-transitory computer-readable medium of claim 28, wherein the instructions to transmit the uplink signal using the one or more antennas of the first antenna group in accordance with the transmit power are executable by the one or more processors to:

transmit the uplink signal using the one or more antennas of the first antenna group based at least in part on the first power limit for each first antenna of the first antenna group and each carrier frequency of the one or more carrier frequencies.

30. The non-transitory computer-readable medium of claim 26, wherein the instructions to transmit the sounding reference signal are executable by the one or more processors to:

transmit the sounding reference signal based at least in part on an exposure limit of a user equipment (UE).

* * * * *